(12) United States Patent
Kumar et al.

(10) Patent No.: US 8,695,031 B2
(45) Date of Patent: Apr. 8, 2014

(54) SYSTEM, DEVICE, AND METHOD FOR DELIVERING MULTIMEDIA

(75) Inventors: Kshitij Kumar, San Jose, CA (US); Avigdor L. Steinberg, Menlo Park, CA (US); Debraj Paul, San Francisco, CA (US)

(73) Assignee: Concurrent Computer Corporation, Duluth, GA (US)

( * ) Notice: Subject to any disclaimer, the term of this patent is extended or adjusted under 35 U.S.C. 154(b) by 343 days.

(21) Appl. No.: 12/376,119

(22) PCT Filed: Aug. 1, 2007

(86) PCT No.: PCT/US2007/017170
§ 371 (c)(1),
(2), (4) Date: Feb. 2, 2009

(87) PCT Pub. No.: WO2008/016634
PCT Pub. Date: Feb. 7, 2008

(65) Prior Publication Data
US 2009/0199230 A1   Aug. 6, 2009

Related U.S. Application Data

(60) Provisional application No. 60/834,952, filed on Aug. 2, 2006, provisional application No. 60/906,850, filed on Mar. 14, 2007, provisional application No. 60/907,458, filed on Apr. 2, 2007, provisional application No. 60/907,634, filed on Apr. 12, 2007, provisional application No. 60/907,635, filed on Apr. 12, 2007, provisional application No. 60/924,430, filed on May 15, 2007.

(51) Int. Cl.
*H04N 7/10* (2006.01)
*G06Q 30/00* (2012.01)

(52) U.S. Cl.
USPC .......................................... 725/32

(58) Field of Classification Search
USPC ........... 725/9–21, 32–36, 110, 133, 134, 114, 725/115, 145, 151, 139; 709/204, 217, 227, 709/231
See application file for complete search history.

(56) References Cited

U.S. PATENT DOCUMENTS 5,774,666 A   6/1998   Portuesi
5,956,716 A * 9/1999   Kenner et al. .................. 1/1

(Continued)

OTHER PUBLICATIONS

International Search Report and Written Opinion for PCT/US2007/017170 completed Jun. 6, 2008.

(Continued)

*Primary Examiner* — Benjamin Bruckart
*Assistant Examiner* — Rong Le
(74) *Attorney, Agent, or Firm* — Philip H. Burrus, IV

(57) ABSTRACT

A system and method for delivery of multimedia data includes a plurality of media devices coupled to each other via a network. Each of the media devices is configured to retrieve multimedia data and advertisement data from an external source such as a public and/or private network. The multimedia data may include a number of video clips and the advertisement data includes a number of advertisements. Each media device is also configured to associate an advertisement of the advertisement data to a video clip of the multimedia data based on one of a number of criteria and transmit the associated video clip and advertisement to a playback device for viewing thereon.

27 Claims, 19 Drawing Sheets

(56) References Cited

U.S. PATENT DOCUMENTS

| | | | |
|---|---|---|---|
| 6,463,585 B1* | 10/2002 | Hendricks et al. | 725/35 |
| 6,760,916 B2* | 7/2004 | Holtz et al. | 725/34 |
| 6,963,898 B2* | 11/2005 | Yoshimine et al. | 709/203 |
| 8,108,895 B2* | 1/2012 | Anderson et al. | 725/36 |
| 8,250,179 B2 | 8/2012 | Yu et al. | |
| 2002/0116716 A1* | 8/2002 | Sideman | 725/91 |
| 2003/0233650 A1* | 12/2003 | Zaner et al. | 725/32 |
| 2004/0117455 A1* | 6/2004 | Kaminsky et al. | 709/214 |
| 2005/0071469 A1* | 3/2005 | McCollom et al. | 709/225 |
| 2006/0130120 A1* | 6/2006 | Brandyberry et al. | 725/136 |
| 2006/0218618 A1* | 9/2006 | Lorkovic | 725/135 |
| 2007/0055987 A1* | 3/2007 | Lu et al. | 725/34 |
| 2008/0092168 A1 | 4/2008 | Logan et al. | |
| 2009/0228919 A1 | 9/2009 | Zott et al. | |
| 2009/0300702 A1* | 12/2009 | Johnson et al. | 725/129 |
| 2009/0320077 A1* | 12/2009 | Gazdzinski | 725/62 |
| 2012/0089996 A1* | 4/2012 | Ramer et al. | 725/14 |

OTHER PUBLICATIONS

Montoya, Oschta I., "NonFinal OA", U.S. Appl. No. 12/587,664, filed Oct. 10, 2009; Mailed Oct. 1, 2012.

Montoya, Oschta I., "Final OA", U.S. Appl. No. 12/587,664, filed Oct. 10, 2009; Mailed Apr. 8, 2013.

\* cited by examiner

US 8,695,031 B2

SYSTEM, DEVICE, AND METHOD FOR DELIVERING MULTIMEDIA

CROSS REFERENCE TO RELATED APPLICATIONS

This application is the U.S. national phase of PCT/US2007/017170 filed Aug. 1, 2007. PCT/US2007/017170 claims priority under 35 U.S.C. §119(e) to U.S. Provisional Application Ser. No. 60/834,952, filed on Aug. 2, 2006, to U.S. Provisional Application Ser. No. 60/906,850, filed on Mar. 14, 2007, to U.S. Provisional Application Ser. No. 60/907,458, filed on Apr. 2, 2007, to U.S. Provisional Application Ser. No. 60/907,634, filed on Apr. 12, 2007, to U.S. Provisional Application Ser. No. 60/907,635, filed on Apr. 12, 2007, and to U.S. Provisional Application Ser. No. 60/924,430, filed on May 15, 2007. The entirety of each of 60/834,952, 60/906,850, 60/907,458, 60/907,634, 60/907,635, 60/924,430, and PCT/US2007/017170 is hereby incorporated by reference herein.

TECHNICAL FIELD

The present disclosure relates generally to systems, devices, and associated algorithms for delivering multimedia to an end user.

BACKGROUND

Television access is prevalent worldwide. Users of television services use such services for the availability of news, entertainment purposes, educational purposes, and the like. Additionally, the Internet and other network sources are increasingly being used for the publication and consumption of video and other multimedia information. Such multimedia includes content of interest to the general population. However, the number of users with access to the Internet and other network sources is a small subset of the users of television services. As such, large proportions of users are unable to access or cannot easily access the multimedia information available via the network sources including the Internet.

Additionally, the peer-to-peer distribution of multimedia data over networked sources such as the Internet is restricted by the available bandwidth. Such consumption of bandwidth can be costly to the end-users. Further, such multimedia data obtained over the Internet and other network sources may or may not be legally obtained.

SUMMARY

According to one aspect, a system for delivering multimedia may include a plurality of media devices coupled to each other via a network. Each of the media devices may be configured to retrieve multimedia data from an external source such as, for example, a private and/or public network. Additionally, each of the media devices may be configured to retrieve advertisement data from the external source. The multimedia data may include a number of video clips. The advertisement data may include a number of advertisements. Each of the media devices may also be configured to store the multimedia data and the advertisement data. Additionally, each of the media devices may be configured to transmit the multimedia data to at least one other media device in response to a request for the multimedia data. Further, each of the media devices may be configured to associate an advertisement of the advertisement data to a video clip of the multimedia data.

The media devices may store the multimedia data in a distributed manner. The advertisement may be associated with the video clip based on metadata associated with the video clip and the advertisement. For example, the advertisement may be associated with the video clip based on at least one of the category of the video, the category of the advertisement, a profile of the a user requesting the video, and the popularity of the video. The network may be a hybrid peer-to-peer-client/server network.

In some embodiments, each of the media devices may be configured to transmit the associated video and advertisement to a television service provider headend station. Additionally, in some embodiments, the system may include a playback device coupled to at least one of the media devices and located remotely therefrom. The playback device may be configured to receive the associated video and advertisement from the coupled media device in response to a request from a user of the playback device and display the associated video and advertisement to the user. Additionally, the playback device may be configured to display a preview of available videos to the user and generate a request for a video in response to a selection made by the user. Further, the playback device may be configured to upload a video to one of the media devices in response to a command provided by the user. Additionally, in some embodiments, the media device coupled to the playback device may be configured to determine a number of available sources of the user requested video and select a sub-set of the number of available sources based on a calculated download time of each number of available sources.

According to another aspect, a method for delivering multimedia may include retrieving multimedia data and advertisement data from an external source. The multimedia data may include a number of video clips. The advertisement data may include a number of advertisements. The method may also include storing the multimedia data and the advertisement data. Additionally, the method may include transmitting the multimedia data to at least one other media device over a network in response to a request for the multimedia data. Further, the method may include associating an advertisement of the advertisement data to a video clip of the multimedia data.

In some embodiments, the step of storing the multimedia data may include storing the multimedia data in a distributed manner between at least two of the media devices. Additionally, the step of associating the advertisement to the video clip may include associating the advertisement to the video clip based on metadata associated with the video clip and the advertisement. The step of associating the advertisement to the video clip may include associating the advertisement to the video clip based on at least one of the category of the video, the category of the advertisement, a profile of the a user requesting the video, and the popularity of the video. In some embodiments, the step of transmitting the multimedia data to the at least one other media device over the network may include transmitting the multimedia data to the at least one other media device over a hybrid peer-to-peer-client/server network.

In some embodiments, the method may also include transmitting the associated video and advertisement to a television service provider headend station. Additionally, the method may include receiving the associated video and advertisement with a playback device coupled to at least one of the media devices and located remotely therefrom in response to a request form a user of the playback device. The method may also include displaying the associated video and advertisement to the user. The method may further include displaying a preview of available videos to the user and generating a request for a video in response to a selection made by the user. Additionally, the method may include uploading a video to one of the media devices in response to a command provided by the user. The method may additionally include determining a number of available sources of the user requested video and selecting a sub-set of the number of available sources based on a calculated download time of each number of available sources.

Accordingly to a further aspect, a system selecting and associating an advertisement to a video clip may include a first server, a second server, and a processing circuit. The first server may be configured to retrieve multimedia data from a number of networks based on the popularity of the multimedia data and store the multimedia data in a networked database. The multimedia data may include a number of video clips. The second server may be configured to retrieve advertisement data from the number of networks based on an advertisement rate of the advertisement data and store the advertisement data in the networked database. The advertisement data may include a number of advertisements. The processing circuit configured to retrieve the multimedia data and the advertisement data from the networked database. The processing circuit may also be configured to associate an advertisement of the advertisement data to a video clip of the multimedia data. Additionally, the processing circuit may be configured to determine a display presentation template based on the advertisement and the video clip.

In some embodiments, the first server may be configured to determine at least one technical parameter of the video clip selected from the group consisting of: the encoding format of the video clip, the resolution of the video clip, the frame rate of the video clip, the picture aspect ratio of the video clip, the noise level of the video clip, presence of black bands in the video clip, and the signal levels of the video clip. Additionally, in some embodiments, the first server may be configured to receive evaluation data related to the video clip submitted by an operator of the server, the evaluation data including a quality rating and an aspect ratio determined subjectively by the operator. The first serve may also be configured to insert digital rights management data into the video clip. Further, in some embodiments, the second server is configured to determine at least one technical parameter of the advertisement selected from the group consisting of: the number of phrases in the advertisement, the length of statements in the advertisement, the encoding format of the advertisement, the presence of web links in the advertisement, the presence of pictures in the advertisement, the encoding format of the pictures, and the position of the pictures.

In some embodiments, the processing circuit may be configured to associate the advertisement to the video clip based on metadata associated with the video clip and the advertisement. Additionally or alternatively, the processing circuit may be configured to associate the advertisement to the video clip based on at least one of the category of the video, the category of the advertisement, a profile of the a user requesting the video, and the popularity of the video. The processing circuit may also be configured to determine a display presentation template having a predefined region for displaying the video clip and at least one predefined region for displaying the advertisement. Additionally or alternatively, the processing circuit may be configured to determine a color scheme of the advertisement based on the metadata of the video clip. The processing circuit may also be configured to determine at least one text property of the advertisement selected from the group consisting of: font size, text color, scroll speed, and text length.

According to yet another embodiment, a method for selecting and associating an advertisement to a video clip may include retrieving multimedia data from a number of networks based on the popularity of the multimedia data. The multimedia data may include a number of video clips. The method may also include retrieving advertisement data from the number of networks based on an advertisement rate of the advertisement data. The advertisement data may include a number of advertisements. The method may further include storing the multimedia data and the advertisement data in a networked database. Additionally, the method may include retrieving the multimedia data and the advertisement data from the networked database. The method may also include associating an advertisement of the advertisement data to a video clip of the multimedia data. Further, the method may include determining a display presentation template based on the advertisement and the video clip.

In some embodiments, the method may include determining at least one technical parameter of the video clip selected from the group consisting of: the encoding format of the video clip, the resolution of the video clip, the frame rate of the video clip, the picture aspect ratio of the video clip, the noise level of the video clip, presence of black bands in the video clip, and the signal levels of the video clip. Additionally, in some embodiments, the method may include electronically receiving evaluation data related to the video clip submitted by an operator, the evaluation data including a quality rating and an aspect ratio determined subjectively by the operator. The method may also include inserting digital rights management data into the video clip. Further, the method may include determining at least one technical parameter of the advertisement selected from the group consisting of: the number of phrases in the advertisement, the length of statements in the advertisement, the encoding format of the advertisement, the presence of web links in the advertisement, the presence of pictures in the advertisement, the encoding format of the pictures, and the position of the pictures.

In some embodiments, the method may include associating the advertisement to the video clip based on metadata associated with the video clip and the advertisement. Additionally, in some embodiments, the method may include associating the advertisement to the video clip based on at least one of the category of the video, the category of the advertisement, a profile of the a user requesting the video, and the popularity of the video. The method may also include determining a display presentation template having a predefined region for displaying the video clip and at least one predefined region for displaying the advertisement. The method may additionally include determining a color scheme of the advertisement based on the metadata of the video clip. Further, the method may include determining at least one text property of the advertisement selected from the group consisting of: font size, text color, scroll speed, and text length.

Accordingly to yet another aspect, a system for suggesting multimedia data for viewing by a user may include a server and a client. The server may be configured to retrieve multimedia data and advertisement data from an external source such as a public and/or private network. The server may also be configured to store the multimedia data and the advertisement data in a networked database. The multimedia data including a number of video clips and the advertisement data including a number of advertisements. The client may be coupled to the server via a network. The client may be configured to transmit website data of a website viewed by a user of the client to the server via the network. The server may be further configured to determine a selection of videos clips from the number of video clips based on the website data and a user profile of the user and transmit indicia of the selection of video clips to the client.

In some embodiments, the server may be configured to determine a selection of videos clips from the number of video clips based on the keywords and metadata of the website data. Additionally, the server may be configured to determine a selection of videos clips from the number of video clips based on data indicative of the identity of the user, the preferences of the user, and the playback device used by the user. The server may also be configured to transmit a video clip of the selection of video clips to the client in response to a selection made by the user. Additionally, the server may be configured to generate an e-mail including a link to a video clip of the selection of video clips based on a selection made by the user.

In some embodiments, the server may also be configured to transmit data indicative of a number of products for sell to the client, the server being responsive to a selection made by the user of the client to place an order for one of the number of products. The server may also be configured to determine a selection of videos clips from the number of video clips based historical data indicative of the websites viewing habits of the user. The server may be configured to determine a selection of videos clips from the number of video clips based similarities of the preferences of the user and a user of another client. The server may also be configured to determine a selection of videos clips from the number of video clips based on the popularity of the each video clip of the number of video clips. Further, in some embodiments, the server may be configured to determine an advertisement from the number of advertisements based on user ratings of each of the number of advertisements and transmit advertisement to the client.

Accordingly to yet another aspect, a method for suggesting multimedia data for viewing by a user may include transmitting website data related to a website viewed by a user of a client machine to a server. The method may also include retrieving multimedia data and advertisement data from an external source. The multimedia data including a number of video clips and the advertisement data including a number of advertisements. Additionally, the method may include storing the multimedia data and the advertisement data in a networked database. The method may also include determining a selection of videos clips from the number of video clips based on the website data and a user profile of the user. Further, the method may include transmitting indicia of the selection of video clips to the client.

In some embodiments, the method may include determining a selection of videos clips from the number of video clips based on the keywords and metadata of the website data. The method may also include determining a selection of videos clips from the number of video clips based on data indicative of the identity of the user, the preferences of the user, and the playback device used by the user. Additionally, in some embodiments, the method may include transmitting a video clip of the selection of video clips to the client in response to a selection made by the user. The method may also include generating an e-mail including a link to a video clip of the selection of video clips based on a selection made by the user.

In some embodiments, the method may further include transmitting data indicative of a number of products for sell to the client and electronically placing an order for one of the number of products in response to a selection made by the user of the client. Additionally, the method may include determining a selection of videos clips from the number of video clips based historical data indicative of the websites viewing habits of the user. The method may also include determining a selection of videos clips from the number of video clips based similarities of the preferences of the user and a user of another client. The method may further include determining a selection of videos clips from the number of video clips based on the popularity of the each video clip of the number of video clips. The method may yet further include determining an advertisement from the number of advertisements based on user ratings of each of the number of advertisements and transmitting the advertisement to the client.

Accordingly to yet another aspect, a system for determining a value of multimedia data may include a first server, a second server, and a processing circuit. The first server may be configured to retrieve multimedia data from a number of networks and store the multimedia data in a networked database. The multimedia data may include a number of video clips. The second server may be configured to retrieve advertisement data from the number of networks and store the advertisement data in the networked database. The advertisement data including a number of advertisements. The processing circuit may be configured to determine a monetary value for each of the number of video clips based on the respective popularity of each of the number of video clips. The processing circuit may also be configured to determine a monetary value for each of the number of advertisements based on an advertisement cost of each of the number of advertisements. Further, the processing circuit may be configured to associate a plurality of the number of advertisements with a video clip of the number of video clips such that the sum of the monetary value of the video clip and the advertisement costs of the plurality of advertisements is maximized.

In some embodiments, the first server may be configured to determine at least one technical parameter of the video clip selected from the group consisting of: the encoding format of the video clip, the resolution of the video clip, the flame rate of the video clip, the picture aspect ratio of the video clip, the noise level of the video clip, presence of black bands in the video clip, and the signal levels of the video clip. Additionally, the first server may be configured to receive evaluation data related to the video clip submitted by an operator of the server, the evaluation data including a quality rating and an aspect ratio determined subjectively by the operator. Additionally, in some embodiments, the first server may be configured to insert digital rights management data into the video clip. Further, the second server may be configured to determine at least one technical parameter of the advertisement selected from the group consisting of: the number of phrases in the advertisement, the length of statements in the advertisement, the encoding format of the advertisement, the presence of web links in the advertisement, the presence of pictures in the advertisement, the encoding format of the pictures, and the position of the pictures.

In some embodiments, the processing circuit may be configured to determine the monetary value for each of the number of video clips based on the respective popularity of each of the number of video clips and user profile data for a particular user of the system, the profile data including preferences of the user. Additionally, the processing circuit may be configured to determine the monetary value for each of the number of video clips based on at least one of the genre of the number of video clips, the technical quality of the number of video clips, the time of the showing of each of the number of video clips, the time of the showing of each of the number of video clips relative to a predetermined time, the location of the expected viewer of the each of the number of video clips and the preferences of the expected viewer of the each of the number of video clips. In some embodiments, the processing circuit may be configured to determine the monetary value for each of the number of video clips based on historical data indicative of the video clips previously viewed by a user of the system. Additionally, the processing circuit may be configured to adjust the determined monetary value for each of the number of video clips based on the temporal difference between the current date and a predetermined date. Further, in some embodiments, the processing circuit may be configured to determine a monetary value for each of the number of video clips with respect to each of a number of users of the system and determine a monetary value for each of the number of video clips with respect to prospective advertiser in each of the number of video clips.

According to yet another embodiment, a method for determining a value of multimedia data may include retrieving multimedia data from a number of networks. The multimedia data may include a number of video clips. The method may also include retrieving advertisement data from the number of networks. The advertisement data may include a number of advertisements. The method may also include storing the multimedia data and the advertisement data in a networked database. Additionally, the method may include determining a monetary value for each of the number of video clips based on the respective popularity of each of the number of video clips. The method may also include determining a monetary value for each of the number of advertisements based on an advertisement cost of each of the number of advertisements. Further, the method may include associating a plurality of the number of advertisements with a video clip of the number of video clips such that the sum of the monetary value of the video clip and the advertisement costs of the plurality of advertisements is maximized.

In some embodiments, the method may also include determining at least one technical parameter of the video clip selected from the group consisting of: the encoding format of the video clip, the resolution of the video clip, the frame rate of the video clip, the picture aspect ratio of the video clip, the noise level of the video clip, presence of black bands in the video clip, and the signal levels of the video clip. Additionally, the method may include electronically receiving evaluation data related to the video clip submitted by an operator, the evaluation data including a quality rating and an aspect ratio determined subjectively by the operator. The method may also include inserting digital rights management data into the video clip. Further, the method may include determining at least one technical parameter of the advertisement selected from the group consisting of: the number of phrases in the advertisement, the length of statements in the advertisement, the encoding format of the advertisement, the presence of web links in the advertisement, the presence of pictures in the advertisement, the encoding format of the pictures, and the position of the pictures.

In some embodiments, the method may include determining the monetary value for each of the number of video clips based on the respective popularity of each of the number of video clips and user profile data for a particular user of the system, the profile data including preferences of the user. Additionally, the method may include determining the monetary value for each of the number of video clips based on at least one of the genre of the number of video clips, the technical quality of the number of video clips, the time of the showing of each of the number of video clips, the time of the showing of each of the number of video clips relative to a predetermined time, the location of the expected viewer of the each of the number of video clips and the preferences of the expected viewer of the each of the number of video clips. The method may also include determining the monetary value for each of the number of video clips based on historical data indicative of the video clips previously viewed by a user of the system. Additionally, the method may include adjusting the determined monetary value for each of the number of video clips based on the temporal difference between the current date and a predetermined date. The method may further include determining a monetary value for each of the number of video clips with respect to each of a number of users of the system and determining a monetary value for each of the number of video clips with respect to prospective advertiser in each of the number of video clips.

According to yet another aspect, a system for selecting an advertisement based on a number of bids for a particular advertisement resource may include a first server, a second server, and a processing circuit. The first server may be configured to retrieve multimedia data from a number of networks based on the popularity of the multimedia data. The multimedia data may include a number of video clips. The first server may also be configured to store the multimedia data in a networked database, the multimedia data including a number of video clips. The second server may be configured to retrieve advertisement data from the number of networks based on an advertisement rate of the advertisement data. The advertisement data may include a number of advertisements. The second server may also be configured to store the advertisement data in the networked database.

The processing circuit may be configured to retrieve a video clip from the number of video clips from the networked database based on a selection made by a user. The processing circuit may also be configured to determine a first monetary value for the video clip with respect to the user. Additionally, the processing circuit may be configured to determine a second monetary value of the video clip with respect to an advertiser. The processing circuit may also be configured to determine a third value of the user to the advertiser. Further, the processing circuit may be configured to associate an advertisement of the number of advertisements with the video clip based on the first monetary value, the second monetary value, and the third value.

In some embodiments, the first server may be configured to determine at least one technical parameter of the video clip selected from the group consisting of: the encoding format of the video clip, the resolution of the video clip, the frame rate of the video clip, the picture aspect ratio of the video clip, the noise level of the video clip, presence of black bands in the video clip, and the signal levels of the video clip. Additionally, the first server may be configured to receive evaluation data related to the video clip submitted by an operator of the server, the evaluation data including a quality rating and an aspect ratio determined subjectively by the operator. The first server may also be configured to insert digital rights management data into the video clip. Further, the second server may be configured to determine at least one technical parameter of the advertisement selected from the group consisting of: the number of phrases in the advertisement, the length of statements in the advertisement, the encoding format of the advertisement, the presence of web links in the advertisement, the presence of pictures in the advertisement, the encoding format of the pictures, and the position of the pictures.

In some embodiments, the processing circuit may be configured to generate a set of Edit Decisions Lists including instructions for converting the video clip and the advertisement into dynamic composite images. Additionally, the processing circuit may be configured to determine the first monetary value based on a user profile including data indicative of the genre preferences of the user, determine the second monetary value based on an advertiser profile including data indicative of the genre preferences of the advertiser, and/or determine the third value based on the user profile. Additionally, the processing circuit may be configured to select the advertisement from the number of advertisements based on other advertisements associated with the video clip. The processing circuit may also be configured to select the advertisement from the number of advertisements having a genre different from the genre of other advertisements associated with the video clip. Further, the processing circuit may be configured to associate the advertisement of the number of advertisements with the video clip based on the genre of video clips with which the advertisement has previously been associated.

According to a further aspect, a method for determining a value of multimedia data may include retrieving multimedia data from a number of networks. The multimedia data may include a number of video clips. The method may also include retrieving advertisement data from the number of networks. The advertisement data may include a number of advertisements. The method may also include storing the multimedia data and the advertisement data in a networked database. Additionally, the method may include retrieving a video clip from the number of video clips from the networked database based on a selection made by a user. The method may also include determining a first monetary value for the video clip with respect to the user. The method may further include determining a second monetary value of the video clip with respect to an advertiser. The method may additionally include determining a third value of the user to the advertiser. Further, the method may include associating an advertisement of the number of advertisements with the video clip based on the first monetary value, the second monetary value, and the third value.

In some embodiments, the method may include determining at least one technical parameter of the video clip selected from the group consisting of: the encoding format of the video clip, the resolution of the video clip, the frame rate of the video clip, the picture aspect ratio of the video clip, the noise level of the video clip, presence of black bands in the video clip, and the signal levels of the video clip. Additionally, the method may include electronically receiving evaluation data related to the video clip submitted by an operator, the evaluation data including a quality rating and an aspect ratio determined subjectively by the operator. The method may also include inserting digital rights management data into the video clip. Further, the method may include determining at least one technical parameter of the advertisement selected from the group consisting of: the number of phrases in the advertisement, the length of statements in the advertisement, the encoding format of the advertisement, the presence of web links in the advertisement, the presence of pictures in the advertisement, the encoding format of the pictures, and the position of the pictures.

In some embodiments, the method may also include generating a set of Edit Decisions Lists including instructions for converting the video clip and the advertisement into dynamic composite images. Additionally, the method may include determining the first monetary value comprises determining the first monetary based on a user profile including data indicative of the genre preferences of the user, determining the second monetary value comprises determining the second monetary value based on an advertiser profile including data indicative of the genre preferences of the advertiser, and/or determining the third value comprises determining the third value based on the user profile. The method may additionally include selecting the advertisement from the number of advertisements based on other advertisements associated with the video clip. The method may also include selecting the advertisement comprises selecting the advertisement from the number of advertisements having a genre different from the genre of other advertisements associated with the video clip. Further, the method may include associating an advertisement of the number of advertisements with the video clip comprises associating the advertisement of the number of advertisements with the video clip based on the genre of video clips with which the advertisement has previously been associated.

BRIEF DESCRIPTION OF THE DRAWINGS

The detailed description particularly refers to the following figures, in which.

DETAILED DESCRIPTION OF THE DRAWINGS

Figure 1:
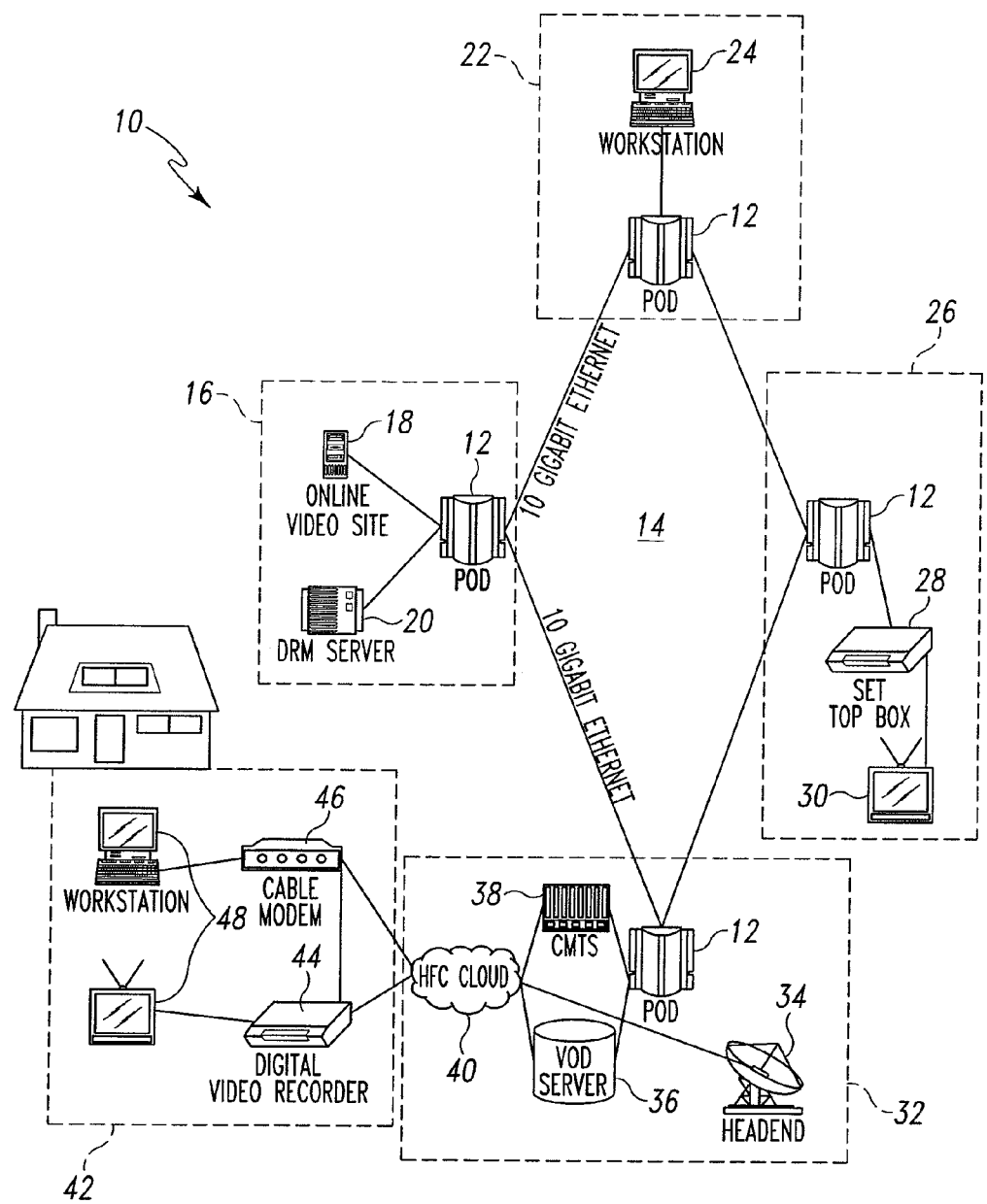
FIG. 1 is a diagrammatic view of a system for delivery multimedia data.

While the concepts of the present disclosure are susceptible to various modifications and alternative forms, specific exemplary embodiments thereof have been shown by way of example in the drawings and will herein be described in detail. It should be understood, however, that there is no intent to limit the concepts of the present disclosure to the particular forms disclosed, but on the contrary, the intention is to cover all modifications, equivalents, and alternatives falling within the spirit and scope of the invention as defined by the appended claims.

Referring to FIG. 1, a system 10 for delivering multimedia includes a number of media devices 12 interconnected via a network 14. The network 14 may be embodied as any type of network and/or combination of networks including, but not limited to, any one or more of local area networks, wide area networks, and/or publicly-accessible global networks such as, for example, the Internet. As such, any one or more underlying physical standards may be used to transmit and receive multimedia data over the network 14 including, but not limited to hybrid fiber coaxial (HFC), digital subscriber line (DSL), Ethernet, and/or passive optical networks (PON), and/or the like. To do so, the network 14 or portions thereof may be configured to transmit and/or receive the multimedia data using any suitable communication protocol including, but not limited to, internet protocol (IP), transmission control protocol (TCP), and/or internet protocol television (IPTV).

As illustrated in FIG. 1, the media devices 12 may be located in one of a number of different locations based on the intended function of the device 12. For example, one or more media devices 12 may be located at a multimedia repository facility 16, which as discussed below may be configured to retrieve multimedia data from various sources such as the Internet, store the multimedia data, and transmit the multimedia data on demand. As such, the multimedia repository facility 16 may include an online video site server 18 and a digital rights management server 20 for determining and/or ensuring digital rights management of the multimedia data retrieved from the various sources.

One or more media devices 12 may also be located at other types of businesses or other entities 22 for transmitting and/or receiving multimedia over the network 14. Such businesses may include, for example, media organizations, video production companies, advertisement companies, or any other type of business or entity in which the delivery and/or transmission of multimedia is desirable. Such business 22 may include one or more workstations 24, which may be embodied as any type of computer or video monitoring device.

Additionally, one or more media devices 12 may be located in the residence 26 of an end-user. The distributed media device 12 may be communicatively coupled to a set top box, such as a standard set top box, which is communicatively coupled to one or more video display devices 30. The end-user may operate the distributed media device 12 to select, retrieve, view, and/or transmit multimedia data including, but not limited to video and/or audio clips, full-length movies, movie shorts, news broadcasts, or any other type of multimedia as discussed in more detail below.

One or more media devices 12 may also be located inside the head-end of one or more television provider and/or telecommunications provider 32 including providers of over-the-air television, cable television, satellite television, and/or Internet access providers. The television/telecommunication provider 32 may include one or more head-ends 34, such as satellites of the like, for receiving multimedia from a variety of sources. In some embodiments, the television/telecommunication provider 32 may include a video on demand server 36 for providing videos, movies, and other multimedia data to an end-user upon request. Additionally, in some embodiments, the television/telecommunication provider 32 may include a cable modem termination system 38 and/or other telecommunication system for providing Internet or other networking services to the end-user. In some embodiments, the components of the television/telecommunication provider 32 may be connected to one or more end-user residence 42 via a hybrid fiber coaxial network 40.

In such embodiments, the end-user residence 42 may include, for example, a digital video recorder (DVR) 44 and/or a cable modem or other network access device 46, which are coupled to the hybrid fiber coaxial network 40. The end user residence 42 may also include any number of display devices 48 including televisions, monitors, personal computers, and/or the like.

Each of the media devices 12 are similar in design, but may differ in functionality based on the intended function of the media device. Each distributed media device 12 is configured to acquire audio, video, and textual content, including the related advertising text data, provide peer-to-peer communications with other media devices 12 and/or other multimedia storage devices and/or locations, store multimedia data, maintain multimedia inventory and access databases, process multimedia to, for example, convert the format of the multimedia into a broadcast-able format, and/or interface with a video-on-demand and/or other play-out servers of a head-end station such as a cable television provider.

As such, the media devices 12 are embodied as multi-functional devices configured to provide access to a variety of multimedia data to the end-users including, but not limited to, audio, video, games, text, or other multimedia. For example, the system 10 is configured to deliver material available on the Internet, e.g. clips from YouTube or Guba web portals, to the consumer TV. Such material may include, for example, source video clips, which were originally intended for viewing in a small window on a PC screen Such video clips may be enhanced for display on the larger screen of a consumer television via use of various algorithms for scaling, filtering, interpolation, and the like by the media devices 12.

Additionally, the system 10 provides the end-user with an amount of interaction with the multimedia data. For example, multimedia content may be shared between users and/or transferred between devices (e.g., desktop computers, mobile media devices, storage devices, and/or the like) under the user's control or with devices of other users. The content is shared by a peering relationship that may be created between two user devices, between one user device and a network device, or between multiple user and network devices. Users can request and receive content that may be free to use, or may have various payment options associated with it, including advertising based models as well as pay-per-use, subscription, or other models. Additionally, the end-users of the system 10 may share multimedia content that they themselves have generated. Further, the end-users, who may be subscribers to different services from different Service Providers, may generate reviews and other multimedia content that can be shared, edited, and consumed by other end-users of the system 10. Because the system 10 facilitates the storage of the multimedia data, the end-users may view or otherwise consume the multimedia data at any time. That is, the multimedia data may be time-shifted.

The multimedia data available via the system 10 includes content that is provided by cable television operators as well as content obtained from other sources such as the Internet. For example, multimedia data that is available at an online web site can be stored and viewed at home on display devices owned by the end-user. Such multimedia data may be analyzed, prepared, improved, modified, with or without text being added—or it may be presented in the original form.

Figure 2:
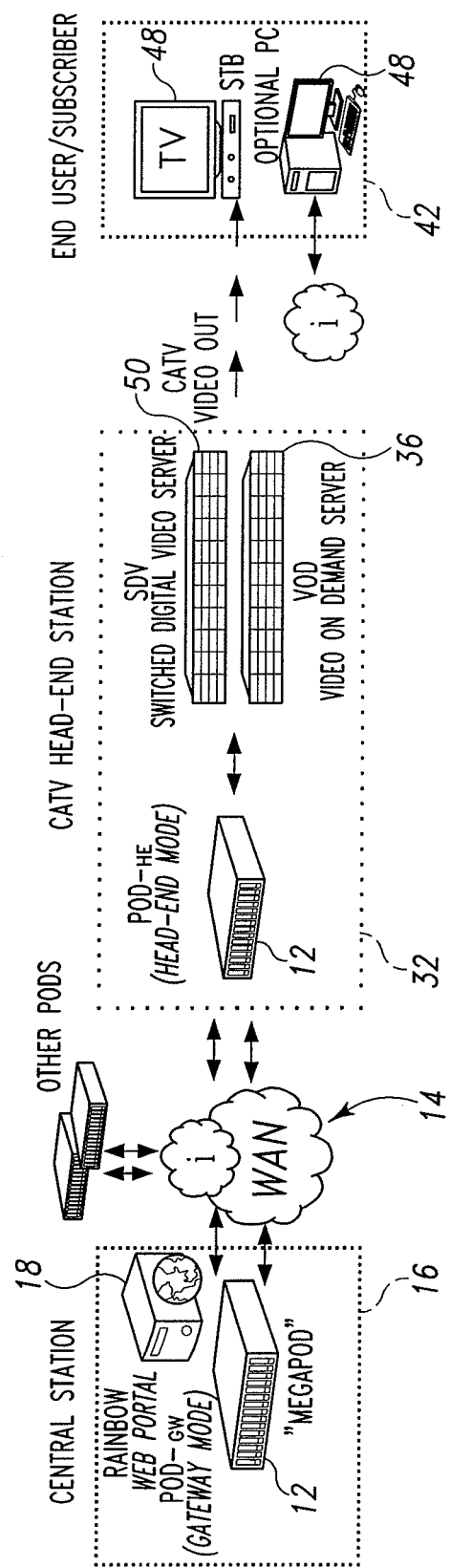
FIG. 2 is a diagrammatic view of particular components of the system of FIG. 1.

Referring now to FIG. 2, as discussed previously, on or more media devices 12 may be located at a multimedia repository facility 16. Although the media devices 12 are similar in construction, some media devices 12 may have larger storage and/or processing functionality such as the media devices 12 of the multimedia repository facility 16. The multimedia repository facility 16 utilizes one or more online video site servers 18 to search for and retrieve video, audio, textual, and other multimedia from network sources such as the Internet. The multimedia repository facility 16 stores such multimedia in the distributed media device 12, which as discussed above may include a large storage capability.

Because the multimedia is typically formatted for transmission and viewing via the network (e.g., the Internet), the multimedia may require processing to reformat the multimedia data for transmission across the network 14 and subsequent viewing by an end-user on any one of a number of different display devices. Alternatively or additionally, the multimedia such as videos may be processed by other media devices 12 such as those media devices 12 located at the television/telecommunication provider 32.

As discussed in more detail below, multimedia data embodied as video data may be processed to include one or more advertisements. For example, the distributed media device 12 located at the multimedia repository facility 16 may be configured to process the video data to include advertising text overlays. The processed video may then be transmitted via the network 14 to one or more media devices 12 located at a multimedia repository facility 16. The multimedia repository facility 16 may, in some embodiments, add additional advertisement text to the video. Subsequently, the video is transmitted by the multimedia repository facility 16 to the distributed media device 12 located in the residence 42 of the end-user via use of one or more video-on-demand servers 36 and switched digital video servers 50. The end-user may receive the video using the set-top box 28 via the standard cable television (CATV) video cable connection. The end-user may view the video on any one or more display devices 48. The transmission of the video may be initiated by a request from the end-user or, in some embodiments, initiated based on some other criteria such as the popularity of the video clip.

Figure 3:
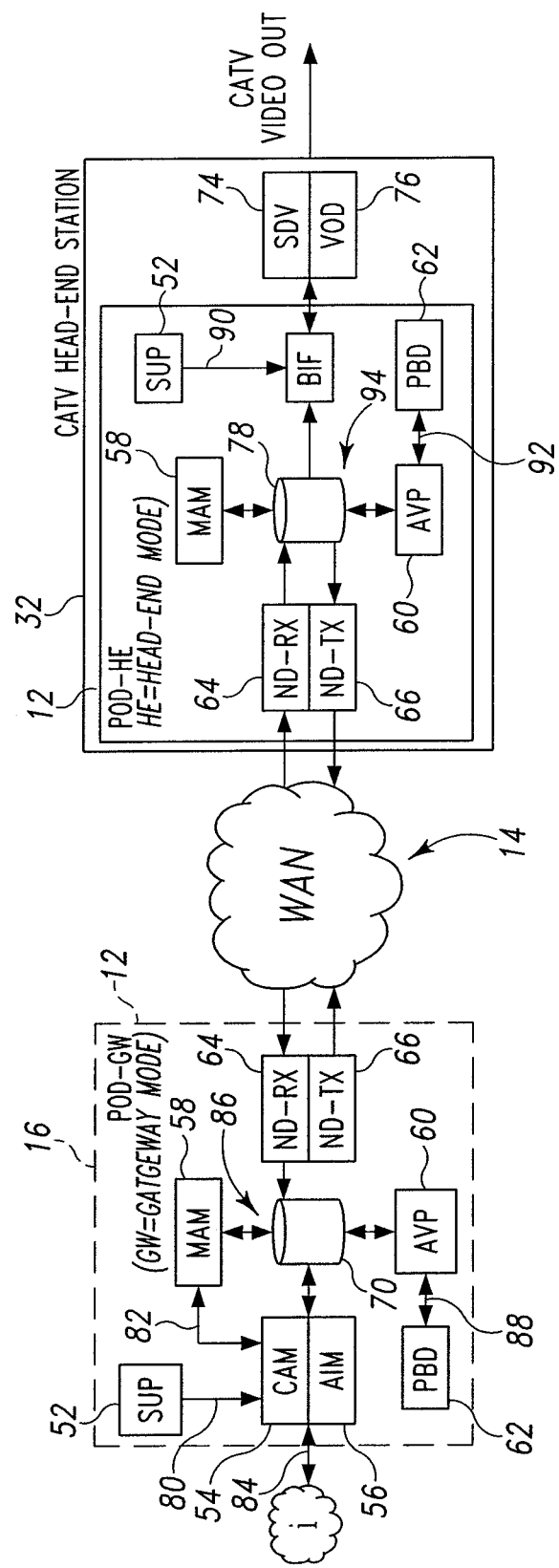
FIG. 3 is a block diagram of one embodiment of a first distributed media device configured in a gateway mode and a second distributed media device configured in a head-end mode.

Referring now to FIG. 3, as discussed previously, the media devices 12 may have different functionally based on the particular application for which the distributed media device 12 is used. As illustrated in FIG. 3, each distributed media device 12 may be configured to operate in a gateway mode or a headend mode. Gateway mode media devices 12 are typically located at the multimedia content aggregator and/or web portal location such as a multimedia repository facility 16. Headend mode media devices 12 are typically located at the television provider and/or telecommunications provider 32 facilities. It should be appreciated that each distributed media device 12 of the system 10 may be configured to operate in any one of the two modes.

The two modes of operation (i.e., gateway mode and headend mode) differ in the amount of data traffic and the direction of video data transfer. In the gateway mode of operation, the data traffic primarily includes original (i.e., non-processed) video files. However, in the headend mode of operation, the outgoing data traffic includes processed, broadcastable format files. As such, the outgoing data traffic of the headend mode of operation can be significantly higher than the incoming data traffic of the original video data due to be processed.

Although each distributed media device 12 includes similar hardware, the software and/or firmware may vary between media devices 12 based on the mode of operation in which the distributed media device 12 is configured. For example, a distributed media device 12 configured for gateway mode of operation may include a supervisor module (SUP) 52, a content acquisition manager (CAM) 54, an advertisement intelligence manager (AIM) 56, a media asset manager (MAM) 58, an audio/video processor (AVP) 60, a program builder and director (PBD) 62, a network distribution module (ND-RX) 64 configured in reception mode, and a network distribution module (ND-TX) 66 configured in transmission mode. As illustrated in FIG. 3, the supervisor module (SUP) 52 and the content acquisition manager (CAM) 54 are communicatively coupled together via a communication link 80. The content acquisition manager (CAM) 54 is also coupled with the media asset manager (MAM) 58 via a communication link 82. Additionally, the content acquisition manager (CAM) 54 is coupled to the Internet or other network via a communication link 84. The audio/video processor (AVP) 60 and the program builder and director (PBD) 62 are communicatively coupled together via a communication link 88. Further, each of the content acquisition manager (CAM) 54, the advertisement intelligence manager (AIM) 56, the media asset manager (MAM) 58, the audio/video processor (AVP) 60, and the network distribution modules 64, 66 are coupled to a database 70 via communication links 86. The communication links 80, 82, 84, 86 may be embodied as any type of communication links including, but not limited to, any number of wires, printed circuit board traces, vias, and/or the like.

Conversely, a distributed media device 12 configured for headend mode of operation may include a supervisor module (SUP) 52, a media asset manager (MAM) 58, an audio/video processor (AVP) 60, a program builder and director (PBD) 62, a network distribution module (ND-RX) 64 configured in reception mode, a network distribution module (ND-TX) 66 configured in transmission mode, and a broadcast interface module (BIF) 68. The supervisor module (SUP) 52 and the broadcast interface module (BIF) 68 may be communicatively coupled together via a communication link 90. The audio/video processor (AVP) 60 and the program builder and director (PBD) 62 may be communicatively coupled together via a communication link 92. Additionally, each of the media asset manager (MAM) 58, the audio/video processor (AVP) 60, the broadcast interface module (BIF) 68, and the network distribution modules 64, 66 are coupled to a database 78 via communication links 94. The communication links 90, 92, 94 may be embodied as any type of communication links including, but not limited to, any number of wires, printed circuit board traces, vias, and/or the like. The broadcast interface module (BIF) 68 of the distributed media device 12 is also coupled to a switched digital video (SDV) server 74 and to a video-on-demand (VOD) server 76.

In operation, the supervisor module (SUP) 52 of the distributed media device 12 configured to gateway mode of operation makes a decision to launch new content acquisition request for the content acquisition manager (CAM) 54 module based on an end-user request or on market demand information. In response, the content acquisition manager (CAM) 54 module, in accordance with a pre-defined list, searches the appropriate websites, looking for the content of the desirable type. When the content acquisition manager (CAM) 54 locates and acquires the new multimedia content (e.g., a video clip obtained from a website), the content acquisition manager (CAM) 54 transfers the multimedia to the media asset manager (MAM) 58. The media asset manager (MAM) 58 stores the multimedia data in the database 70. In embodiments wherein the multimedia data is embodied as a video clip, the video clip may be accompanied by thumbnail picture and some descriptive text information about the clip fetched.

Subsequently, the supervisor module (SUP) 52 requests advertisement data from the advertisement intelligence manager (AIM) 56. The advertisement intelligence manager (AIM) 56 is configured to retrieve an advertisement (video, audio, and/or textual advertisement) that is correlated to the content of the video clip or other multimedia. To do so, the advertisement intelligence manager (AIM) 56 may be configured to analysis tags associated with the video clip or other multimedia contact. That is, the match criteria used by advertisement intelligence manager (AIM) 56 is set by a metadata tags associated with the video clip or other multimedia content. For example, if the video clip shows running dogs, the metadata tags associated therewith may include pet food sources. As such, the advertisement retrieved by the advertisement intelligence manager (AIM) 56 may be embodied as promotional information regarding a pet food store. The advertisement data located by the advertisement intelligence manager (AIM) 56 is also stored in the database 70 by the media asset manager (MAM) 58.

Next, the program builder and director (PBD) 62 generates an Edit Decisions List based on the length of the advertisement text, duration of the video clip, content type tags, and so forth. The Edit Decisions List defines a set of actions, instructions, and/or parameters used to modify or transform a piece of video to a predefined form such as, for example, how to assemble the video and advertisement text for display.

The audio/video processor (AVP) 60 combines the video clip and any advertisements (e.g., advertisement text) into a single dynamic composite video via controls provided by supervisor module (SUP) 52 and the program builder and director (PBD) 62. The audio/video processor (AVP) 60 subsequently converts the composite video clip into a broadcastable data file using any one of a number of video formats such as, for example, MPEG2, MPEG4, or H264. The processing of the video and advertisements, which is done by the audio/video processor (AVP) 60, may include picture scaling, aspect ratio conversion, frame rate conversion, audio formatting, sampling rate conversion, and so forth. In some embodiments, the audio/video processor (AVP) 60 may also be configured to insert optional descriptive information text to, for example, enhance the visual content, and place one or more advertising text overlays beside and/or beneath the main video tile as discussed in more detail below.

Once the video clip or other multimedia data is fully processed and converted into a broadcast-able format, the gateway mode distributed media device 12 transfers the video clip to the headend mode distributed media device 12 across the network 14 via the network distribution modules 64, 66. The processed video clip (i.e., the video clip including any advertisements) is subsequently transferred to the switched digital video (SDV) server 74 or the video-on-demand (VOD) server 76 of the television provider and/or telecommunications provider 32 via the broadcast interface module (BIF) 68. In some embodiments, the program builder and director (PBD) 62 may generate a single video file including any number of separate video clips bundled together into one sequence of a longer duration. Such separate video clips may, or may not, be related to each other. In this way, portions of a larger video may be transferred individually or grouped across the network 14.

In some embodiments, a thumbnail picture and/or description text identifying the newly processes and available video clip or other multimedia data may be uploaded to a web portal of the system 10. The end-users of the system 10 may access the web portal to view which video clips are available and request specific video clips for viewing.

Figure 4:
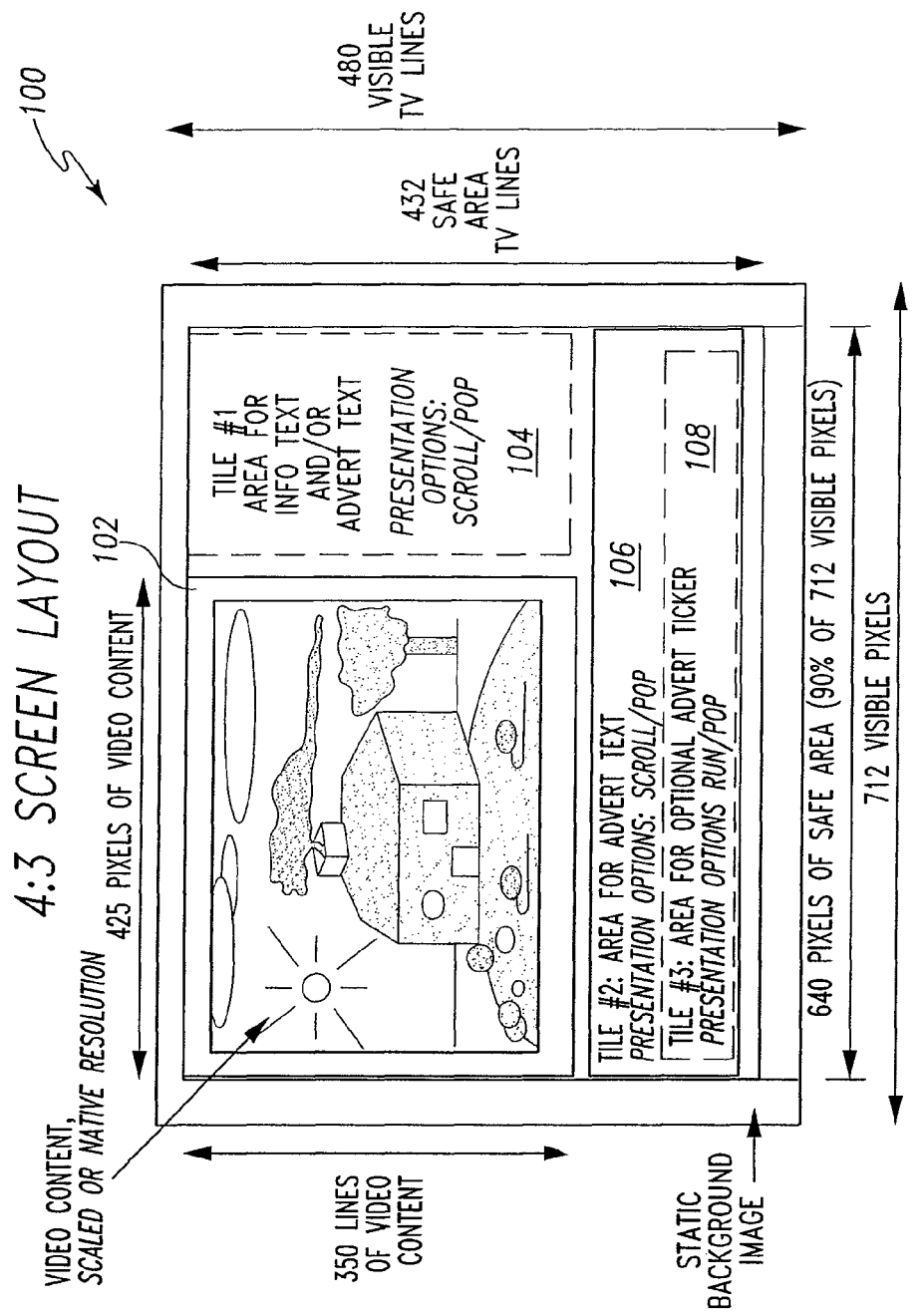
FIG. 4 is an illustrative screen display that is displayed on a display device of the system of FIG. 1.

Referring now to FIG. 4, an illustrative display screen layout 100 of the processed video clip described above. The video clip may be shown in its native resolution, e.g. 320× 240, an assumed resolution, e.g. 425×350, or scaled to any other resolution to match the allocated tile size as illustrated in the display screen layout 100 on the diagram. The display screen layout 100 includes a video or image frame 102, an information frame 104, and an advertisement frame 106. Information related to the video may be displayed in the information frame 104. For example, the title of the video, interesting facts, and other information related to the video, the author of the video, and other information related to or otherwise associated with the video may be displayed in the information frame 104. Alternatively, in some embodiments and/or based on the type of video being displayed, an advertisement may be displayed in the information frame 104. The information and/or advertisements displayed in the information frame 104 may be formatted as pop-up displays or scrolling displays.

Advertisements are displayed in the advertisement frame 106. As discussed previously, the particular advertisements displayed to the end-user are selected based on a set of criteria including, but not limited to, the content of the video being display, the type of advertisement, relationships between advertisements (e.g., advertisements for similar products or services are typically not displayed together to in close temporal proximity), advertisement purchase options selected by the advertiser, and other criteria as discussed in more detail below. The advertisements displayed in the frame 106 may be pop-up advertisements and/or scrolling advertisements. In some embodiments, the display screen layout 100 may include a second advertisement frame 108. As with the advertisement frame 16, the advertisements displayed in the frame 108 may be pop-up advertisements and/or scrolling advertisements.

Depending on the category of the content of the video clip, the duration of the video clip, and/or other properties, the clip category, its duration and other properties, alternative presentation layouts having different background pictures, sizes, and/or positions of the frames reserved for the presentation of video and texts may be used. Moreover, the text attributes (e.g., size, color, font, etc.) and the background picture may vary, depending on, for example, the category of the content and the availability and length of the description text string and advertising text strings. As such, it should be appreciated that the display screen layout 100 is but one embodiment of an illustrative display screen layout and that in other embodiments layouts having other dimensions and frames may be used depending on the criteria discussed previously.

Figure 5:
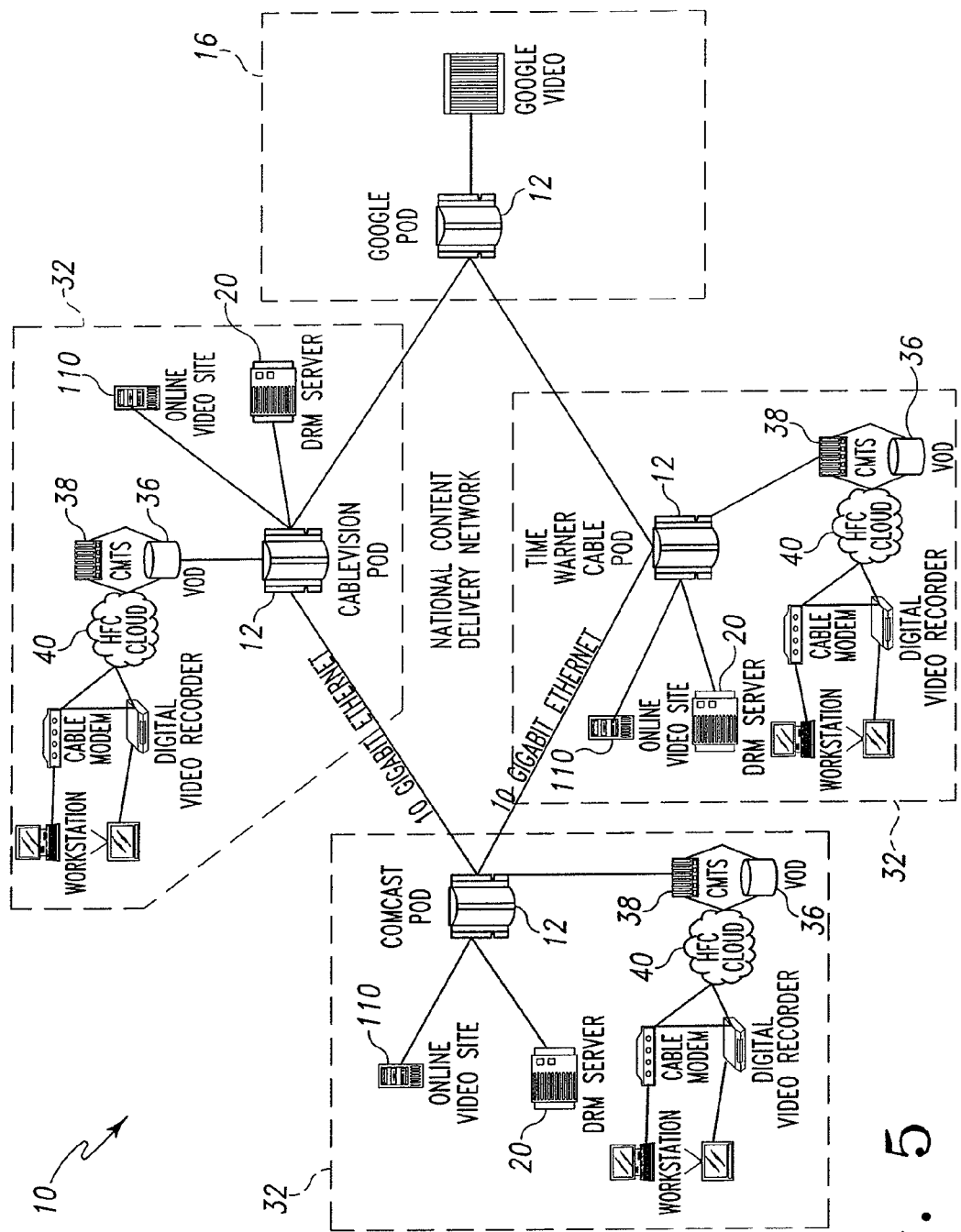
FIG. 5 is a diagrammatic view of one particular embodiment of the system of FIG. 1.

Referring now to FIG. 5, it should be appreciated that the multimedia data, such as videos, may be stored in a distributed manner across a number of media devices 12. That is, a full-length video may be segmented into a number of smaller video clips. Each video clip may be stored on separate media devices 12, which are coupled together via the network 14. As illustrated in FIG. 5, each television service provider 32 includes a distributed media device 12. Additionally, any number of multimedia repository facility 16 may include a distributed media device 12. Yet further, the separate video clips and other multimedia data may be stored on servers and devices within the television service provider 32 and/or multimedia repository facility 16. For example, video clips may be stored on the end-users digital video recorder (DVR) 44, personal computer, game player storage devices, or other fixed or mobile storage devices that are capable of communicative with the distributed media device 12 of the television service provider 32 (e.g., via a modem, digital video recorder, or other device) to which the end-user is subscribed. If desirable, the end-user may allow the stored video clip to be accessible by other end-users of the system 10. If so, the video clips are uploaded to the associated distributed media device 12 for storage and subsequent transmission therefrom.

Any number of the television service providers 32 may include an online video site server 110. An end-user having a subscription to the services of the television service provider 32 may access the online video site to select a video and other multimedia to view. In response, the distributed media device 12 of the relevant television service provider 32 retrieves the selected video and transmits the video to the end-user. As previously discussed, the video may be stored in the database 78 of the distributed media device 12 of the television service provider 32. However, in some cases, the television service provider 32 may not have the video stored locally or may have only a portion of the selected video stored locally. If so, the associated distributed media device 12 is configured to retrieve the remaining video clips or other multimedia from other distributed media devices 12 of the system 10 as discussed below.

The collection of media devices 12 that form a portion of the system 10 are configured in a hierarchy. For example, the distributed media device 12 may be configured as a headend distributed media device, a regional distributed media device, a national distributed media device, or an international distributed media device. Again, although the headend distributed media device, the regional distributed media device, the national distributed media device, and the international media device are similar, the storage capabilities of each may vary greatly. That is, a regional distributed media device is configured to store more multimedia data than the headend distributed media device; the national distributed media device is configured to store more multimedia data than the regional distributed media device, and so forth. Typically, the stored content at any given hierarchy is an aggregation of the multimedia content stored in the databases 70, 78 of the distributed media devices 12 of the next lower hierarchy. The national and international distributed media devices 12 are typically located at peering points in the network 14. The peering points may be embodied as any location within the network 14 wherein other outside networks, such as a television service provider network, may be accessed or otherwise communicated with.

When video clip or other piece of multimedia content is requested by an end-user (e.g., via an online video site), the search for such multimedia content begins at the distributed media device 12 (i.e., the headend distributed media device) of the television service provider 32 to which the end-user is subscribed. If the video or video clip is not stored therein (e.g., in associated database 78), the associated headend distributed media device 12 searches a number of regional distributed media devices 12, which as discussed above has a greater amount of stored multimedia content. If the video or video clip is not stored at any of the regional distributed media device 12, the headend distributed media device 12 searches a number of national distributed media devices 12, which as discussed above has a greater amount of stored multimedia content than the regional distributed media devices 12. If, however, the video or video clip is not stored at any of the national distributed media devices 12, the headend distributed media device 12 searches the associated regional distributed media device 12, which as discussed above has a greater amount of stored multimedia content than the national or global distributed media device 12.

If the video, video clip, or other multimedia content is located at a distributed media device 12 of an intermediary hierarchy, the next level of hierarchy is typically not searched. For example, if the video clip was located at the regional distributed media devices 12, the national and international distributed media devices 12 are not searched. However, in some instances, the number of "backup" sources of the multimedia content may not be sufficient at the particular hierarchy. In such cases, the next higher level of distributed media devices 12 may be searched. For example, if only one source (i.e., one distributed media device 12) is located at the regional distributed media devices 12, the headend distributed media device 12 may be configured to search one or more of the national headend distributed media devices.

Figure 6:
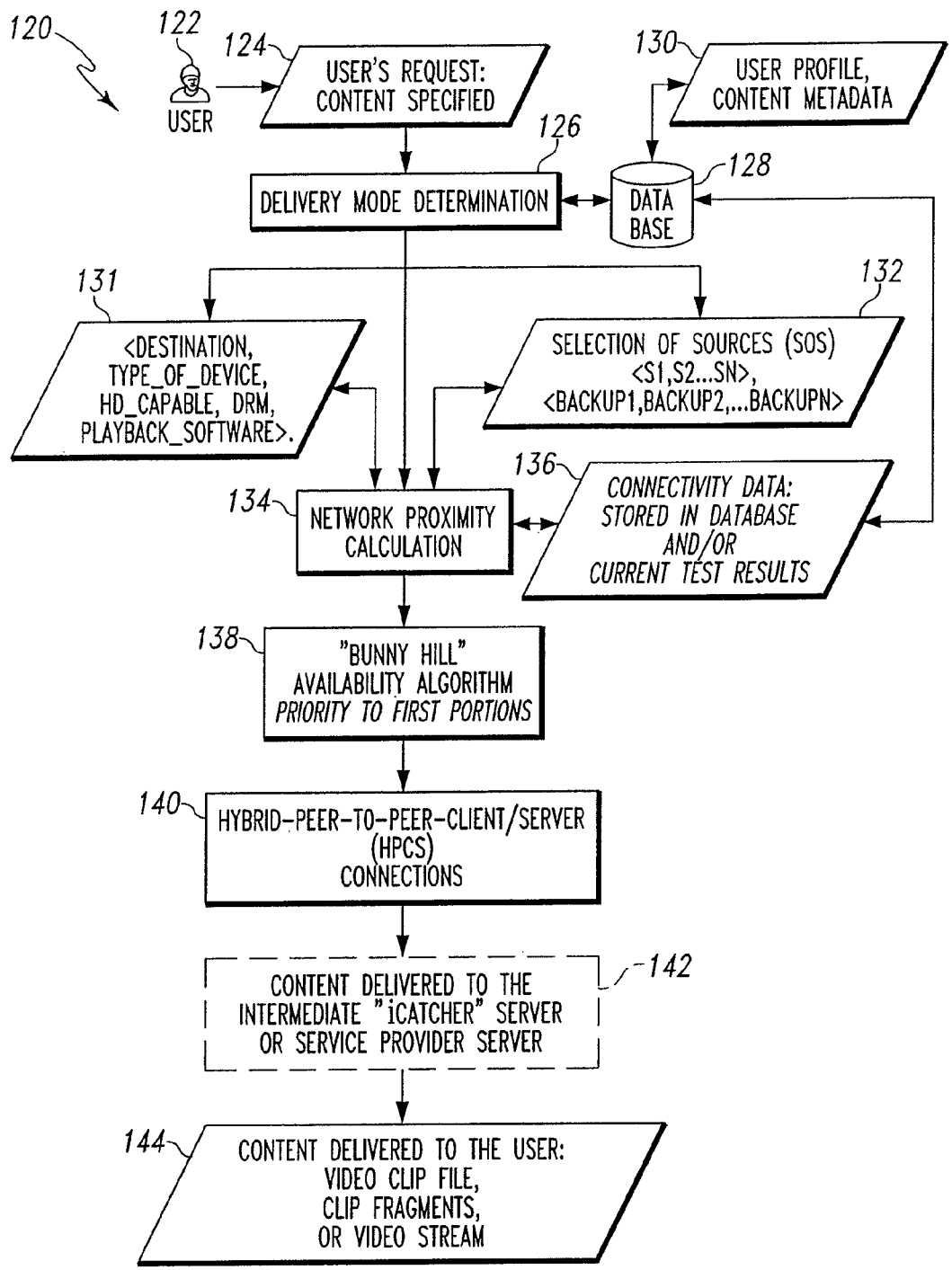
FIG. 6 is a flowchart of an algorithm for delivering multimedia data.

Referring now to FIG. 6, an algorithm 120 is used by the headend distributed media device 12 of the television service provider 32 to which an end-user 122 is subscribed. The algorithm 120 begins with a process step 124 in which the end-user 122 submits a request for a video or other multimedia content. To do so, the end-user 122 may view the list of available multimedia content via a web interface and/or a video-on-demand interface. For example, the end-user 122 may access the online video site server 110 using a personal computer or other computing device capable of accessing the server 110. Alternatively, the end-user 122 may review and select the desired video or other multimedia data from the video-on-demand server 36 of the subscribed television service provider 32.

Once the user has submitted the request in process step 124, the headend distributed media device 12 of the television service provider 32 to which the end-user 122 is subscribed searches for the requested content from local sources such as the associated database 78. If the headend distributed media device 12 does not locate the requested multimedia data from a local source, the headend distributed media device 12 searches for the video or other multimedia data from a remote source such as from a regional, nation, and/or international distributed media device 12 as discussed previously. To do so, the algorithm 120 advances to process step 126 in which the headend distributed media device 12 determines the delivery mode of the requested video or other multimedia data. That is, the headend distributed media device 12 determines the video viewing format and preferences associated with the end-user 122. For example, the headend distributed media device 12 may determine the correct video size, definition standard, and encoding format viewable by the display device used by the end-user 122. To do so, the headend distributed media device 12 may access a database 128 to retrieve the user profile 130 associated with the end-user 122. The user profile 130 may include any type of information for determining the viewing format and preferences associated with the end-user 122. For example, the user profile 130 may include technical data such as data indicative of whether the user is using a digital video recorder (DVR) or a set-top box (STB) playback device, the make of the user's playback device, the size (e.g., 8", 15", 22", etc.) and aspect ratio (e.g., 16:9, 4:3, etc.) of the screen of the playback device, and whether the user's device is high-definition (HD) compatible may be included in the user profile 130.

Once the user profile 130 has been retrieved and the delivery mode has been determined, a delivery mode determination vector 131 is constructed that includes the delivery mode preferences of the user 122. In one illustrative embodiments, the delivery mode determination vector 131 is embodied as a six-tuple data value according to the following format:

<destination, type_of_device, hd_capable, DRM, playback_software> wherein destination is embodied as numerical and/or textual data that identifies the location of the playback device of the end-user 122 such that the video and/or other multimedia may be properly routed to the user, type_of_device is embodied as numerical and/or textual data that identifies the type of playback device used by the end-user 122 (e.g., television, personal computer, portable media device, etc.), hd_capable is embodied as numerical and/or textual data that identifies whether the playback device is capable of displaying video in high definition; DRM is embodied as numerical and/or textual data the identifies whether the particular video and/or other multimedia is subject to digital rights management (DRM), and playback_software is embodied as numerical and/or textual data the identifies the playback mechanism or software used to play the video or other multimedia. For example, if the end-user 122 is using a personal computer that is high definition compatible and executing Windows Media® Player 10, the delivery mode determination vector 131 may be embodied as:

<xyz, pc, true, Microsoft_wm10, Microsoft_wm10> wherein xyz identifies the location of the playback device of the end-user 122, pc identifies that that the end-user 122 is using a personal computer to display the video and/or other multimedia, true identifies that the personal computer and/or software executed thereby is capable of displaying high-definition video, Microsoft_wm10 identifies that the video and/or other multimedia is subject to digital rights management and that such digital rights management is validated via the playback mechanism, and Microsoft_wm10 identifies that the end-user 122 is using Windows Media® Player 10 as the playback mechanism.

It should be appreciated that the list of available multimedia content, which is viewed by the end-user 122 via a web interface and/or a video-on-demand interface, is constructed or otherwise filtered using the delivery mode determination vector 131. As such, the list of available multimedia is filtered to include only those videos and other multimedia matching or otherwise compatible with the delivery mode determination vector 131 of the end-user 122. In some embodiments, the end-user 122 may be able to selectively filter the multimedia such that the end-user 122 may view all available videos and other multimedia content if so desired.

Once the delivery mode determination vector 131 is constructed or otherwise retrieved in process step 126, the algorithm 120 advances to process step 132 in which the sources of the selected video and/or other multimedia are determined. As discussed above, the sources of the selected video may be any one or more of the local headend distributed media device 12, regional distributed media devices 12, national distributed media devices 12, and/or international distributed media devices 12. Because the media devices 12 may store the video or other multimedia in a distributed fashion, one or more devices 12 may be determined to be a source of only a portion of the overall video or other multimedia content.

The number of sources selected may be determined based on the particular embodiment and/or implementation. For example, in some embodiments, only a single source or collection of sources (if the video is distributed across multiple sources) may be determined. However, in other embodiments, any number of additional sources may also be determined such that the overall download or transmission time may be decreased by contemporaneously retrieving the video or other multimedia data from multiple sources. Additionally, in some embodiments, a number of backup sources are determined such that the backup sources may be used if any one or more of the primary sources becomes unavailable or the performance of which is otherwise undesirable.

Once the sources of the video and/or other multimedia content has been determined, a selection of source vector is constructed. The selection of source vector identifies each primary source and, in some embodiments, backup sources.

In one illustrative embodiment, the selection of source vector is embodied as a data value according to the following format:

<S1, S2, . . . Sn>, <Backup1, Backup2, . . . Backupn> wherein S1 . . . Sn are embodied as numerical and/or textual data that identifies the location of the distributed media device 12 that has been determined to be the respective primary source and Backup1 . . . Backupn are embodied as numerical and/or textual data that identifies the location of the distributed media device 12 that has been determined to be the respective backup source.

Once the selection of sources has been determined in process step 132, the algorithm 120 advances to process step 134. In process step 134, a network proximity calculation is performed to determine which of the sources of content are the "closest." Such calculation is based on, for example, the bandwidth of the source, the congestion in the network in the path to the source, the size of upstream path from the source, and/or the like. It should be appreciated that the proximity or closeness of the source may or may not be based on the physical distance between the source and the destination (e.g., the playback device of the user 122 or, in some embodiments, the local headend distributed media device 12). That is, a source that is physically farther away from the destination may be considered to be "closer" if such a source has a greater upstream capacity than a source that is physically closer to the destination. For example, if a first source S1 is able to stream content to the destination at a datarate of 10 megabits per second, and a second source S2 is able to stream content to the destination at a datarate of 11 megabits per second, the source S2 may be considered to be "closer" and therefore preferred over the source S1. Additionally, it should be appreciated that the proximity of a particular source may vary over time. That is, a source may appear "closer" to the local destination at one point in time and farther at another point in time.

In some embodiments, a source may be made to appear "closer" to the destination by modification of network conditions. For example, by use of packet cable multimedia mode, the upstream bandwidth of the source may be increased. Accordingly, because the upstream bandwidth is increased, the "distance" between the source and the destination appears to be reduced for a particular period of time. Of course, during some periods of time, it may not be possible to increase the upstream bandwidth of the source due to higher utilization of the network. During such periods of time, the source would appear "farther" from the destination than during those periods of time in which the network condition is modified to increase the upstream bandwidth of the source.

It should also be appreciated that the proximity calculation is directionally sensitive. That is, the proximity from network point 1 to network point 2 may be different from the proximity from network point 2 to network point 1. As such, the proximity from a particular source to the destination may be dependent upon the particular network path chosen. In such cases, the network path having the closest proximity is used for that particular source.

Once the proximity of each source has been determined in process step 134, the proximity data is stored in the database 128 in process step 136. Subsequently, in process steps 138 and 139, the video and/or other multimedia content is retrieved from the one or more sources determined to be "closest" in process step 134. As discussed above, in some embodiment, the video and/or other multimedia content may be distributed across one or more sources such that portions of the complete video or other multimedia content may be retrieved contemporaneously or serially. Because it has been observed that end-users 122 typically view video content from the beginning, do not skip portions of the beginning of the video content unless such portions have already been viewed previously, and arrive at an opinion about the content while watching the beginning portion of the video content, the video and/or other multimedia is retrieved such that first from the "closest" sources as determined in process step 134. That is, a "bunny hill" algorithm is used, which ensures that the availability of the beginning portions (e.g., the first half) of the video and/or other multimedia content is high, while the availability of subsequently potions of the video and/or other multimedia content may be lower and/or otherwise taper off. Accordingly, the end-user 122 is able to begin watching the video or other multimedia content promptly with relatively low latency. While the view is watching the beginning portion of the video, the subsequent portions are retrieved and queued for displaying or consumption by the end-user 122 because there is more time available to retrieve such subsequent portions.

The video and/or other multimedia content is retrieved using the hybrid peer-to-peer-client/server connections in process step 140. As discussed above, the network of distributed media devices 12 form a hybrid peer-to-peer network wherein one or more of the devices 12 may act like a client and/or a server based on the particular transactions. For example, a particular distributed media device 12 may act as a client when retrieving content from other distributed media devices 12 and as a server when transmitting requested content to other distributed media devices 12.

In some embodiments, the retrieved video and/or other multimedia content is stored in an intermediate location prior to subsequent retransmission to the playback device of the end-user 122 in process step 142. For example, the video and/or other multimedia content may be stored in a server of the television service provider 32 to which the end-user is subscribed. In such embodiments, the availability of the video and/or other multimedia content is increased for other end-users 122 as well as subsequent viewing by the initial end-user 122.

Subsequently, in process step 144, the retrieved video and/or other multimedia content is delivered to the playback device used by the end-user 122 (e.g., set-top box, personal computer, etc.). The video and/or other multimedia may be delivered by streaming the content to the playback device or, in some embodiments, may be downloaded to the playback device of the end-user 122 prior to initiation of playback.

Figure 7:
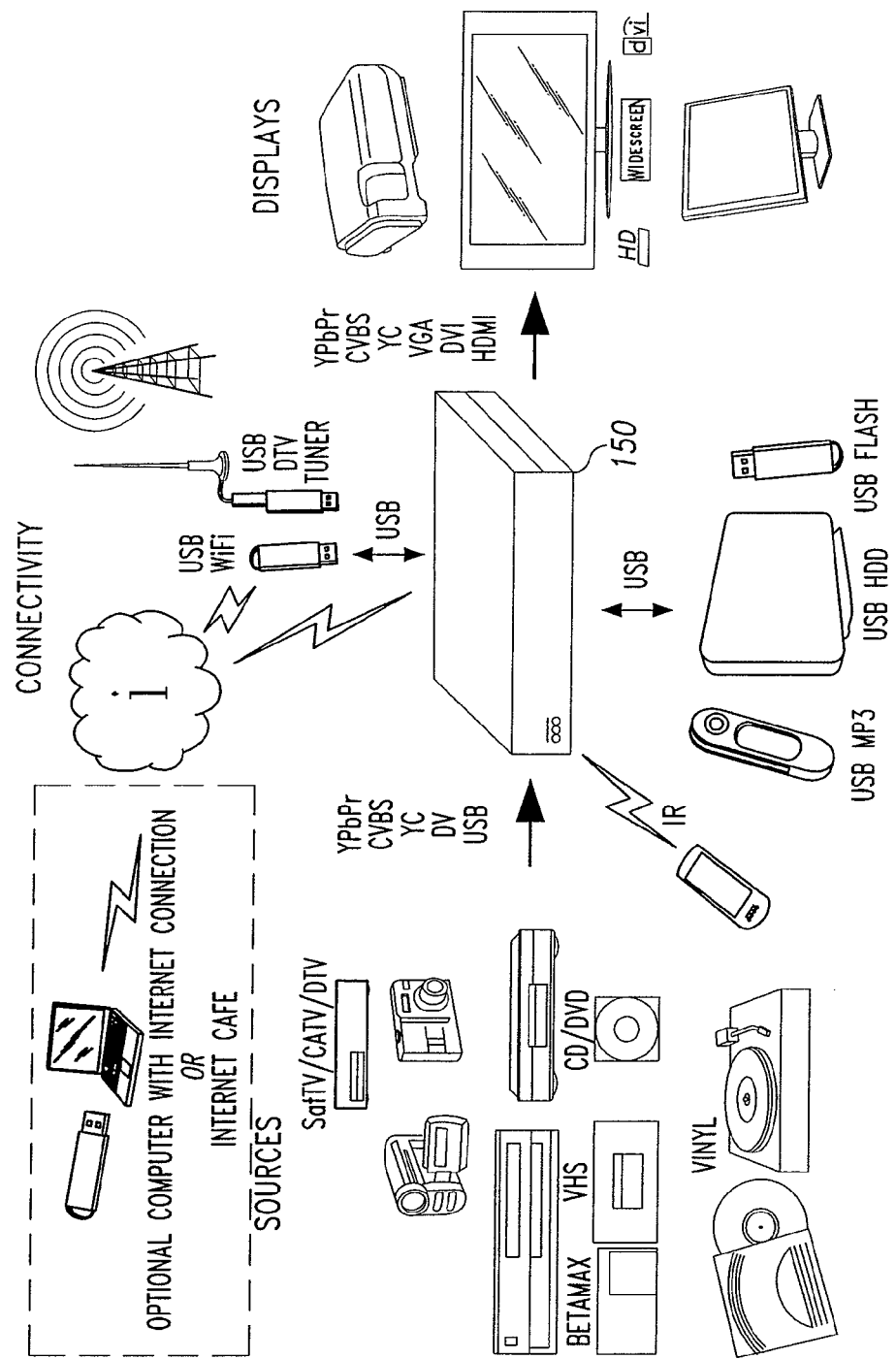
FIG. 7 is a diagrammatic view of one embodiment of a audio/visual omnidirectional port usable with the system of FIG. 1.

Referring now to FIG. 7, in some embodiments, the playback device used by the end-user may be embodied as an audio/video omnidirectional port device 150. The device 150 include a number of input and output devices to facilitate the transfer of video and/or other multimedia content to and from external devices and, in some embodiments, to the local headend distributed media device 12 and/or other devices of the system 10. The audio/video omnidirectional port device 150 may include any one or more of the following components: a router/switcher for audio-visual signals, a recorder/player to/from external audio-visual media, a universal serial bus (USB) flash memory device port configured to receive a USB flash memory device for the storage of audio-visual data, a USB hard disk drive for the storage of audio-video data, connectivity circuitry for use with a digital video tap device such as a camcorder, universal serial buss (USB) MP3 player device port configured to coupled with a USB MP3 player for the storage of audio data, a converter and transcoder for audio-visual content, and Internet personal video recorder (PVR)/player with a universal serial bus buffer, and Internet upload/download tool with online and offline modes, a digital photo camera slide show player and scaler, and/or a video mixer and text to audio-visual rendering tool. Any one or more of such components may be embodied as hardware, software, or a combination of hardware and software.

Figure 8:
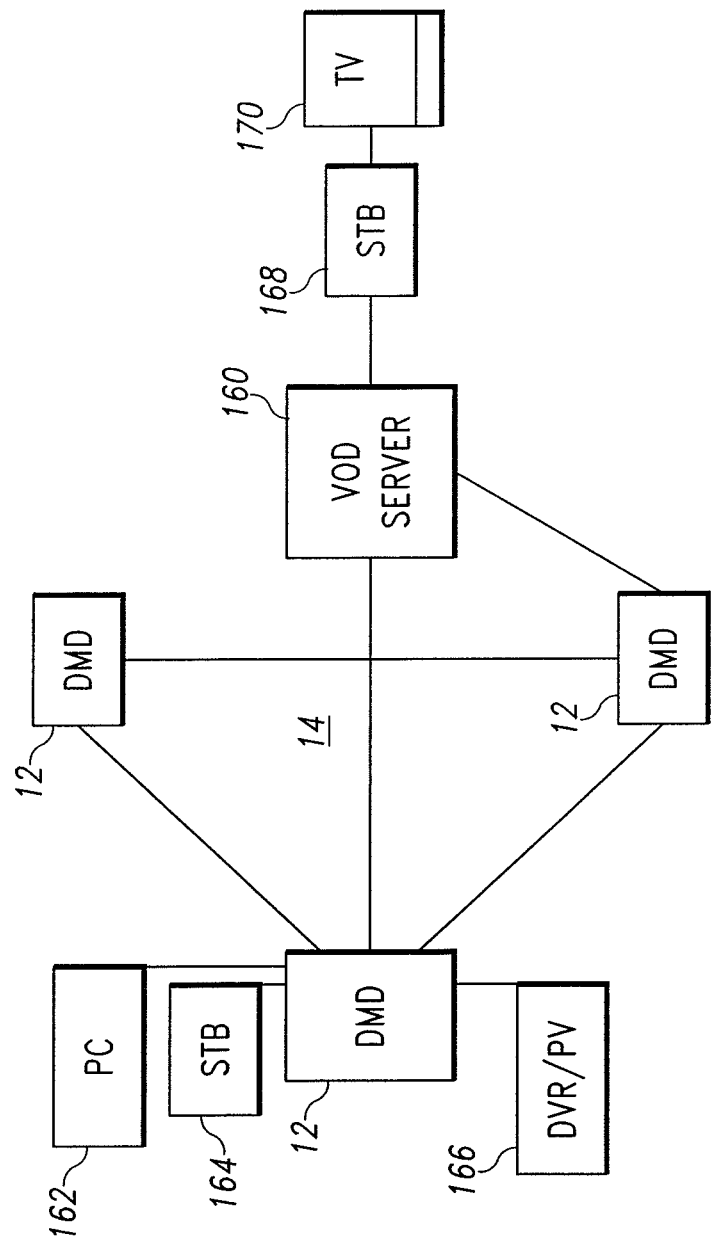
FIG. 8 is a block diagram of one embodiment of particular components of the system of FIG. 1.

Referring now to FIG. 8, in some embodiments, the system 10 is configured such that any one or more of the end-users may upload content to their respective headend distributed media device 12 and other components of the system 10. For example, a portion of the capacity of the video-on-demand (VOD) server 160 of the television provider and/or telecommunications provider to which the end-user is subscribed may be allocated for storage of user-generated or user-provided multimedia content. For example, the end-user may transfer multimedia content, which may be user-generated content or content previously downloaded by the end-user, from the end-user's personal computer 162, the end-user's set-top box 164, and/or the end-user's digital video recorder/player 166 depending upon in which device the multimedia content is stored.

To do so, executable software, e.g., a java applet, is downloaded and installed from the television provider and/or telecommunications provider to which the end-user is subscribed. Such executable software code facilitates the participated of the end-user's personal computer 162, the end-user's set-top box 164, and/or the end-user's digital video recorder/player 166 in the system 10. That is, the end-user may search and browse the available videos and other multimedia content by navigating through menus displayed on the end-users playback device (i.e., the end-user's television, personal computer, portable media device, etc.).

Additionally, the executable software facilitates access by other devices of the network 10 to the user controlled multimedia content that is stored on the playback device of the end-user. Of course, the user may restrict access to a particular sub-population of users or restrict access to particular videos or other multimedia content from everyone. Thus, the content stored and/or originated by the end-user can be shared with all other users connected to the system 10 or uploaded to the appropriate web portal(s). As such, it should be appreciated that end-users of the system 10 are able to share videos and other multimedia content amongst themselves.

In some embodiments, the end-user's playback device (e.g., personal computer, set-top box, television, etc.) may request additional transmission bandwidth from the television provider and/or telecommunications provider to which the end-user is subscribed to allow faster delivery (upload and/or download) of video and other multimedia data. Such requests may be on a temporary basis. The particular bandwidth and the time interval requested may depend on the size of the actual video clip, the time of day, and other factors. The additional bandwidth request may be initiated, for example, by the user when the user desires to retrieve content from a storage device (e.g., a digital video recorder) belonging to or otherwise under the control of a different user.

It should be appreciated that some multimedia, particular multimedia obtainable over the Internet, may be subject to copyrights and other legal protection. To facilitate such protection, the system 10 may be configured such that particular components of the system 10 (e.g., the digital rights management server 20) ensure that the end-user downloading or requesting a particular video or multimedia content has rights to view such content. That is digital rights management techniques may be used within the system 10. While original content created by the user may be distributed by the user, other content may have associated digital rights.

Because the video and other multimedia content is carried over telecommunication and/or television service providers' private network, such content may be monitored during its transport from the source to the destination inside the subscriber's home. That is, the provider may use digital rights management and advanced conditional access technologies to ensure that the content is viewed only by consumers who are authorized to view such content (e.g., those who have paid the appropriate fee).

It should be appreciated that from the end-user's (i.e. the subscriber's) point of view the service provided by the provider appears as an extension of the existing television service. That is, as the end-user may "surf" channels on the end-user's television, the end-user may also view an additional set of channels or additional video-on-demand clips. In some embodiments, such additional channels may be provided free of charge by the television service provider. Such content may be downloaded and viewed free of charge. In such embodiments, the fees are paid via target advertising, which is embedded with the selected video or other multimedia as discussed above and discuss in more detail below. Such advertisements may be selected as short text that is relevant to the end-user based on an advertising profile or relevant to the video or other multimedia that is being displayed.

Additionally, it should be appreciated, that the system 10 allows end-user interaction with the multimedia stored therein. That is, content can be created, uploaded, downloaded, and shared with other end-users. Content is shared by a peering relationship that may be created between two user devices, between one user device and a network device, or between multiple user and network devices. Users can request and receive content that may be free to use, or may have various payment options associated with it, including advertising based models as well as pay-per-use, subscription, or other models.

In some embodiments, the system 10 is configured to obtain video and/or other multimedia content from various locations on the Internet and convert such content into a form that is viewable by a normal television. For example, in one particular embodiment, the top thirty new videos from a selected popular Internet website may be collected, transcoded, and made available to end-users.

It should be appreciated that the system 10 includes a peer-to-peer relationship between various distributed multimedia devices 12 and a client-server relationship between the playback device of the end-user and the local headend distributed multimedia device 12 of the end-user. The peering processes (i.e., the retrieval of content via the network 14) hidden from the end-user such that the content provided via the system 10 appears to the end-user as any other content that is offered by the television service provider.

It should also be appreciated that, in some embodiments, the system 10 may be configured to provide an alternative source of revenue for the television service providers. For example, in addition to advertisement revenues, the system 10 may be configured such that the television service provider may offer products for sell or auction to the end-user. For example, by pressing a button on a remote control, e.g. a red one, a user may request to be redirected to the "Free-On-Demand" video that is dedicated to the video representing an online auction site(s). Additional options may be available within this video-on-demand screen will be more options, allowing the user further selection and navigation control. Once the user has located a desired product, the user receives and transmits the data packets necessary to bid for and purchase the desired product, which is available or otherwise sold online. Such data packets may travel via the network 14 (i.e. via peer-to-peer communication between the distributed media devices 12) or by some other means, e.g., via standard Internet interconnections. It should be appreciated that the auction video is downloaded or otherwise retrieved only for those users requesting the auction video.

An end-user may be able to pay money for an auction that the end-user has won via use of the controls of the television (e.g. . . . , via operation of the remote) in some embodiments. Such payments may, for example, be added to the end-user's monthly subscription bill. In such cases, the purchased product may be shipped to the home address associated with the end-user's subscription account on record by the television service provider. In some embodiments, the television service provider may set a maximum upper limit on the end-user's monthly bill. In such cases, if the end-user exceeds the maximum monthly upper limit, the end-user may continue to purchase items via the onscreen auction by use of a standard credit card or the like.

If an end-user is interested in a certain item of information, such information may be collected from the end-user and used to locate online auctions that match such information. During such time, the end-user may continue to browse amongst items that are being auctioned at multiple sites. Any end-user query may be inputted via the traditional television remote control, by input at a personal computer, or via some other means such as via a cell phone or other portable media device. Such an order will be translated into a search query, which may be a distributed search taking place across multiple online auction sites and multiple online web sites for a piece of content or for a specific item being auctioned. This information is then collected by the system 10 and presented to the end-user, who may bid on one of more items, each of which may be from a different online auction site. As such, it should be appreciated that that system 10 may, in some embodiments, be configured to retrieve auctioned items from a number of different online sources and combine such items into a single auction that is displayed to the end-user.

Figure 9:
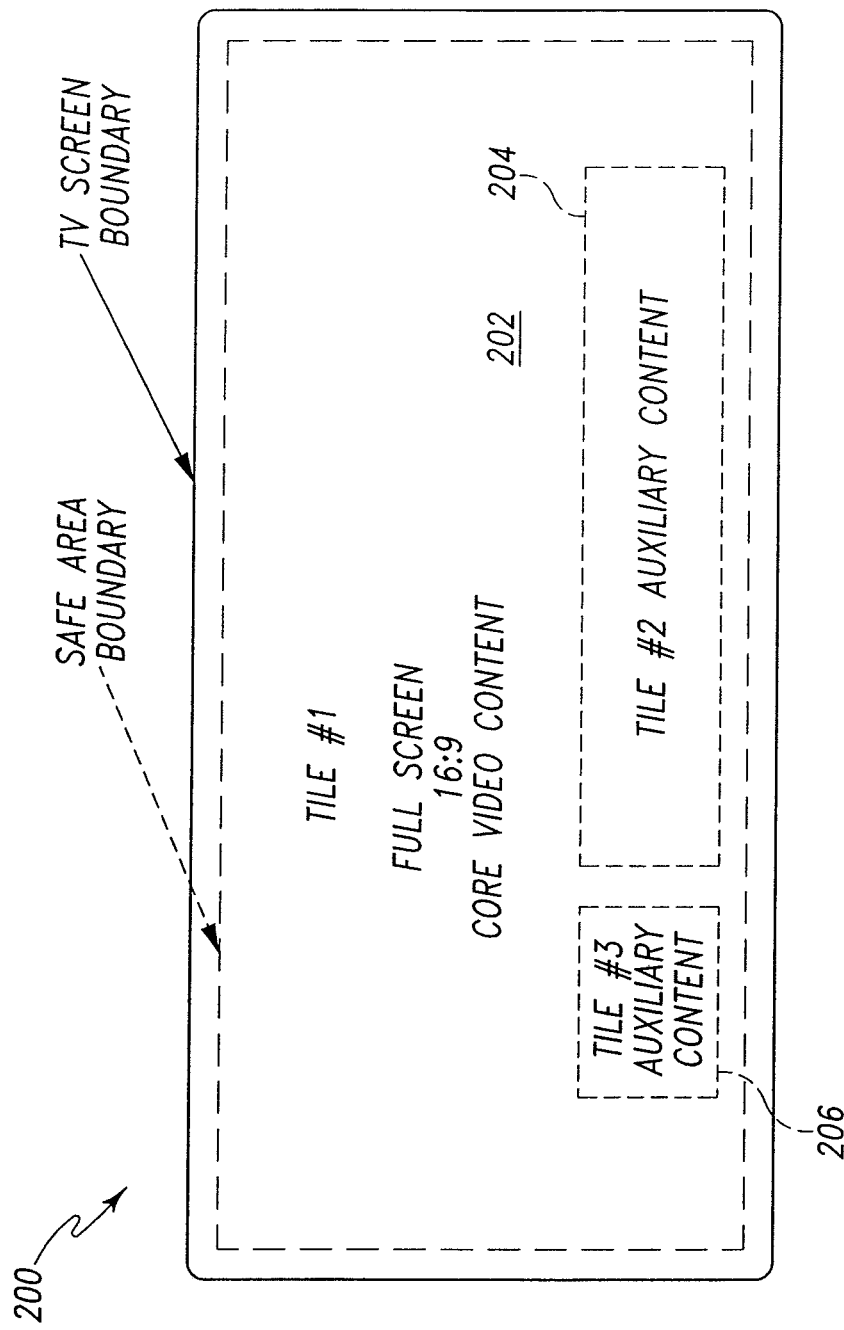
FIG. 9 is an illustration of a typical television display.

As discussed above, each headend distributed media device 12 of the system 10 is configured to appended one or more advertisements to the video and/or other multimedia selected by the end-user. In a typical set-top box system, any additional information such as advertisements, notices, interactive content, tickers, or the like are overlaid on top of the core content. For example, as illustrated in FIG. 9, a television display 200 produced by a typical set-top box system includes a core As illustrated in FIG. 9, a typical television display 200 includes a core content region 202. The core content region 202 has a footprint that takes up the majority of the display 200 and is the region in which the video or picture being viewed by the user is displayed. The television display 200 is similar to those displays generated by typical set-top boxes. As shown in FIG. 9, an auxiliary content region 204 may be rendered by the typical set-top box and overlaid on the core content region. Additionally, a second auxiliary content region 206 may be generated and overlaid on the core content region 202. The auxiliary content displayed in the auxiliary content regions 204, 206 may include such content as picture-in-picture content, various textual news, advertisements, and/or the like. Additionally, interactive menus that are activateable via the user's remote may be displayed in the auxiliary content regions 204, 206.

As illustrated in FIG. 9, the auxiliary content regions 204, 206 rendered by a typical set-top box obscure a portion of the core content region 202. That is, when content is displayed in the regions 204, 206, the user can not view the portion of the core content region 202 that on which the regions 204, 206 are overlaid. To reduce the likelihood that the user misses important information in any of the content being displayed, some systems are configured to manually place the core content region 202, the first auxiliary region 204, and/or the second auxiliary content region 206. For example, during production of the core content, careful selection of TV camera zoom and pan controls are typically used to ensure that any important core content is not obscured by any of the auxiliary content regions 204, 206.

Figure 10:
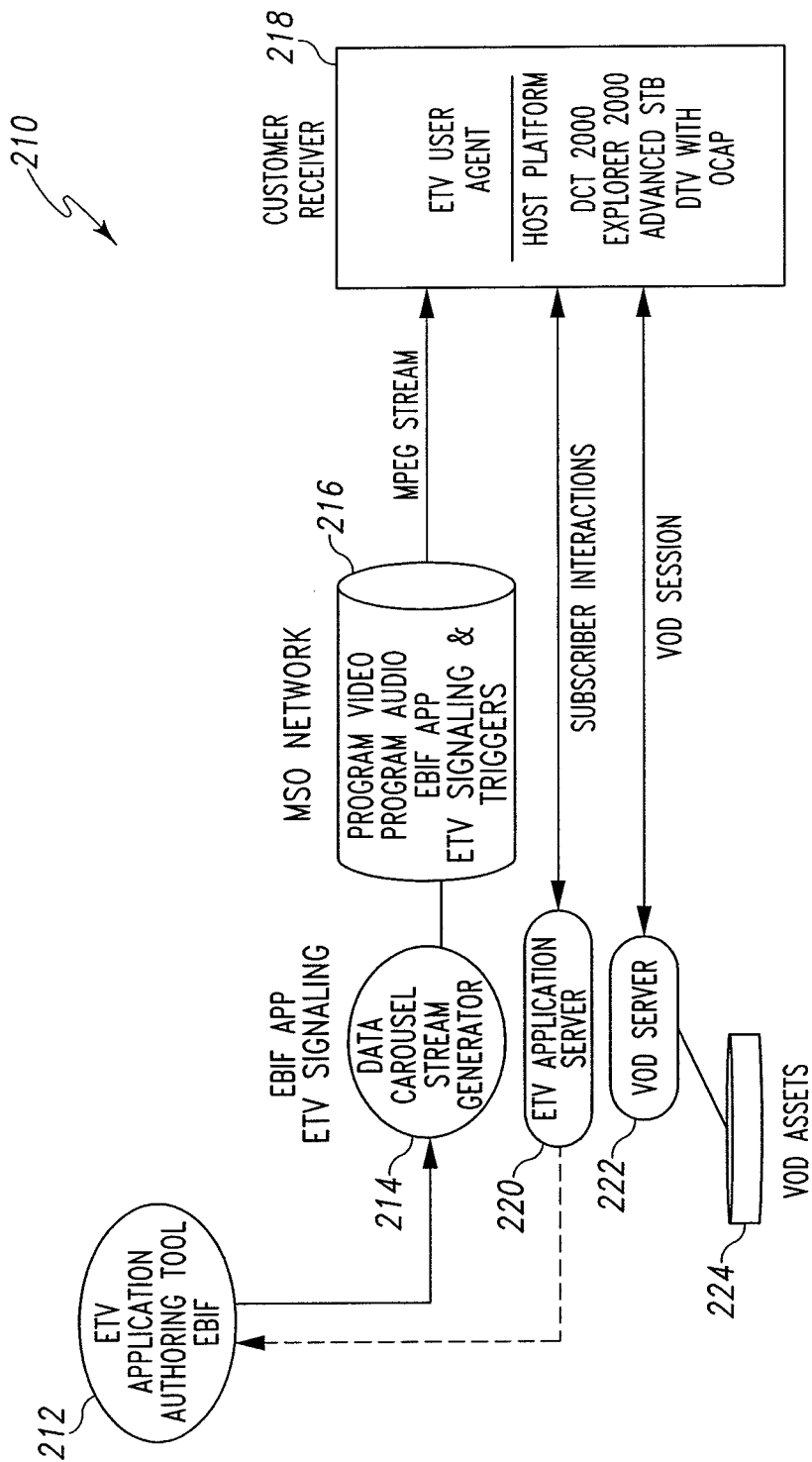
FIG. 10 is diagrammatic view of a system for transporting control data and auxiliary content data.

Referring now to FIG. 10, a system 210 for transporting control data and auxiliary content data using the Enhanced Television Binary Interchange Format (EBIF) in an Enhanced Television environment is illustrated. The Enhanced Television Binary Interchange Format is a common application format designed to provide a national cable footprint for interactive TV content. The Enhanced Television Binary Interchange Format includes some Enhanced Television Specific Components, which also complies to the "Open Cable" (OCAP) Specifications. Enhanced Television is designed for bound applications that need to execute in both constrained legacy and "Open Cable" environments. This includes the ability to launch video-on-demand sessions from within the program stream. The "Open Cable" specification is designed for feature-rich applications that can take advantage of emerging advanced digital television platforms such as, for example, Electronic Program Guide (EPG). However, because Enhanced Television Binary Interchange Format is a subset of the "Open Cable" (OCAP) Specifications, typical "Open Cable" (OCAP) specification compliant applications may not execute in an Enhanced Television Binary Interchange Format environment unless specifically designed to do so.

As illustrated in FIG. 10, however, transport of data using the Enhanced Television Binary Interchange Format (EBIF) in an Enhanced Television environment may be performed by the system 10. The system 10 includes an Enhanced Television application authoring tool 212, which may be embodied as software and/or hardware. The tool 212 is used to generate an Enhanced Television Binary Interchange Format (EBIF) application, which is subsequently provided to a data carousel stream generator 214. The data carousel stream generator 214 generates a stream of data of the video content that has been selected by the user. The data stream is received by a network of Enhanced Television singling and triggers 216. The Enhanced Television singling and triggers 216 generates a video stream using the MPEG format. The MPEG video stream is subsequently received by the receiver 218 of the end-user, which may be embodied as an appropriate digital set-top box having "Open Cable" specification capability.

During the viewing process, the end-user may interact with the content. Any commands or requests from the user to transmitted to an Enhanced Television application server 220. The Enhanced Television application server 220 responds to such commands and requests by sending data back to the receiver 218 of the end-user. In some embodiments, output from the Enhanced Television application server 220 may also be routed to the Enhanced Television application authoring tool 212. If the end-user requests to view a video or other multimedia content from a video-on-demand menu, such a request is transmitted to a video-on-demand server 222. The video-on-demand server 222 interprets the request of the end-user and may retrieve the appropriate video or other multimedia from one or more video-on-demand databases 224. The retrieved video or other multimedia is subsequently transmitted to the end-user receiver 218.

Figure 11:
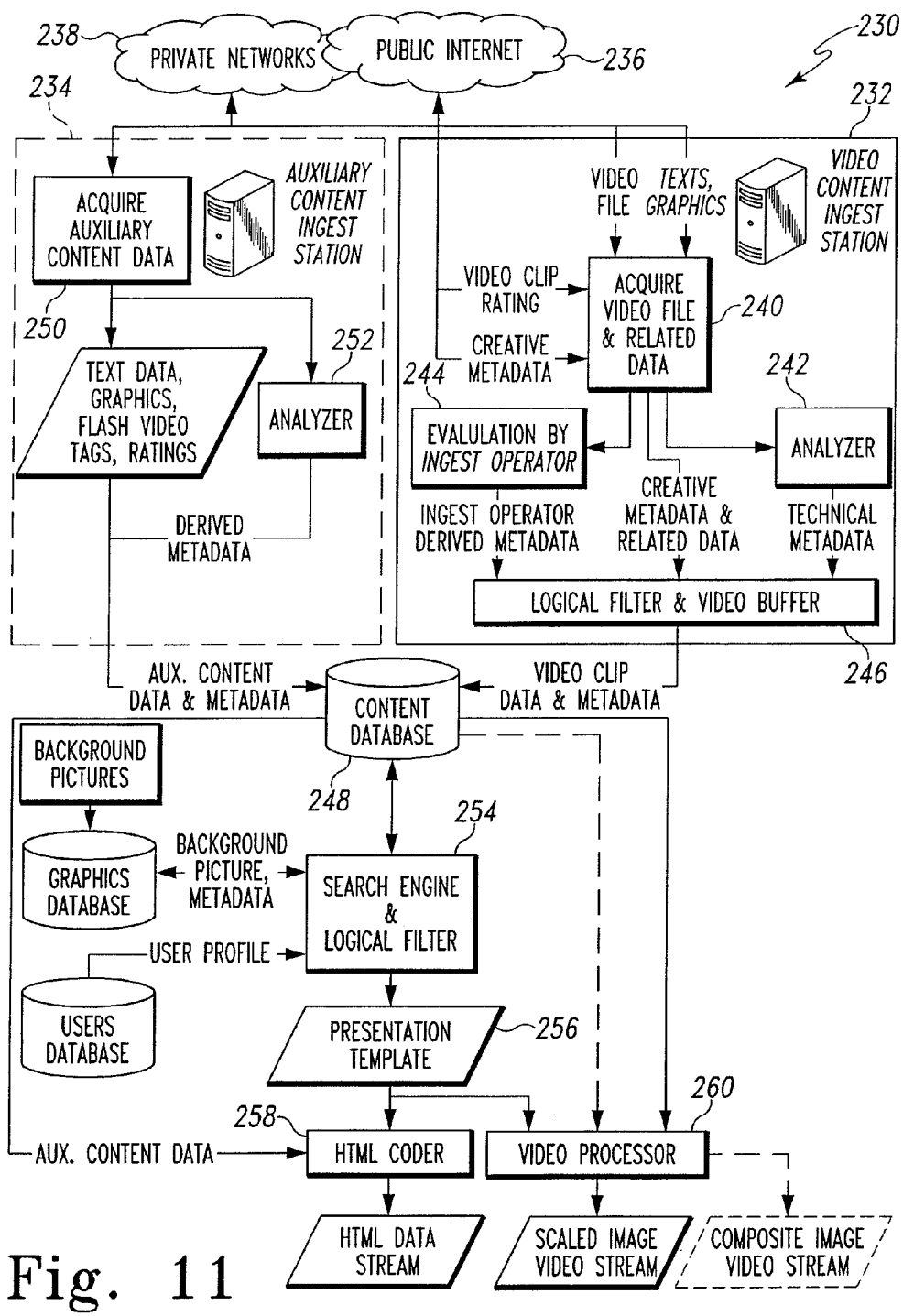
FIG. 11 is a diagrammatic view of a system for selecting and appending advertisements to multimedia data.

Referring now to FIG. 11, a system 230 for selecting and appending advertisements to multimedia data includes a video or other multimedia ingest station or server 232 and an auxiliary or advertisement content ingest station or server 234. Each of the servers 232, 234 are configured to search or otherwise receive content from any number of public networks 236, such as the Internet, and private networks 238. To do so, each of the servers 232, 234 execute a number of algorithms. For example, in regard to the video ingest server 232, the server 232 retrieves video and other multimedia data from the public network 236 and the private network 238 in a process step 240. Such video and other multimedia data may include video data, text, and other graphics such as pictures or the like.

Additionally, the video ingest server 232 may also retrieve various metadata related to the retrieved video. For example, the video ingest server 232 may retrieve video clip ratings, information regarding the authors of the video, additional information regarding the video itself such as subject matter, participants or actors, locations, and so on. It should be appreciated that the additional metadata related to the retrieved videos and other multimedia data may be retrieved contemporaneously with the video, retrieved prior to video, or retrieve at a later time. For example, in embodiments wherein the video ratings are retrieved contemporaneously or at a later time relative to the video, the videos may be stored and subsequently classified. For example, the videos may be stored according to the priority class (e.g., first tier, second tier, third tier, etc.). Alternatively, in some embodiments, the video ratings may be received first such that the retrieval of videos may be prioritized based on such ratings.

In some embodiments, the video content ingest server 232 may access a user profile database (e.g., database 128 as described above in regard to FIG. 6). The user profile database may include "tags" or other data that identifies the type of video or other multimedia preferred by each user. Such preferences may be aggregated such that the preference of the user base, as a whole, can be determined. Subsequently, the retrieval of the videos and other multimedia data may be prioritized based on the preferences of the user base. That is, the preferences of the users may be compared to the metadata associated with each video clip or other multimedia data to determine the priority of the particular video. The videos may then be retrieved according to the order of priority. The retrieval and/or classification of retrieved videos and other multimedia data may be further refined or modified based on the video ratings, other metadata, popularity of the retrieved video among the user base, and/or the like. As such, the collection of videos and other multimedia data will correlate to the preference of the user base.

The retrieved video or other multimedia data, along with any associated metadata, is subsequently provided to a logical filter and video buffer 246. Additionally, the retrieved video or other multimedia data is provided to a technical metadata analyzer 242. The technical metadata analyzer 242 performs a number of analysis's on the video or other multimedia content to determine technical metadata or aspects of the video. For example, the technical metadata analyzer 242 may determine the encoding format, picture resolution, frame rate, picture aspect ratio, presence of "black bands, the audio and/or video signal levels, noise, blockiness, sharpness, color, and/or the like of the video. Such technical metadata is also provided to the logical filter and video buffer 246.

In some embodiments, the retrieved video or other multimedia data may also be evaluated by an operator of the video content ingest server 232 in a process step 244. The operator may provide subjective quality rating data and aspect ratio data of the video or other multimedia data. Such subjective data may or may not match the results of the automatic analysis performed by the analyzer 242. Additionally, any copyright issues (e.g., digital rights management) are addressed in process step 244. To do so, metadata extracted from the video file header (e.g., the genre and any copyright data) or derived therefrom may be used. For example, if it is determined that the video or other multimedia data may infringe on the copyright of the owner, such video may be deleted from the system 230 and flagged accordingly such that the video is not retrieved at a later date.

The logical filter and video buffer 246 converts all incoming data into the format suitable for storage in a content database 248. Additionally, any conflicts or erroneous data associated with the video or other multimedia data may be flagged, replaced with default values, or otherwise reconciled. The re-formatted and filtered video data or other multimedia data along with any metadata including the technical metadata determined by the analyzer 242 are stored in the content database 248.

Referring back to the auxiliary content ingest server 234, the server 234 retrieves auxiliary data from the public network 236 and the private network 238 in a process step 250, which may occur contemporaneously with the retrieval of video data by the video content ingest server 232. Such auxiliary data may include advertisements and other informative data, which may be embodied as text and/or graphical objects including static and/or dynamic images. The retrieved advertisements and other informative data are potentially suitable to match the video and other multimedia data retrieved by the server 232. The prioritization of the acquisition of auxiliary content data may be based on such factors as the advertisement rate associated with the particular advertisement (i.e., the amount of advertisement fee paid by the advertiser for the distribution of the advertisement) similar general business parameters. Additionally, the prioritization of the auxiliary content data may be based on the statistics of registered user profile data, users' explicit requests, and/or users' implicit demand, which may be estimated in accordance with the users' preferences and/or viewing history.

The retrieved auxiliary data is provided to a technical metadata analyzer 252, which may be similar to the analyzer 242 described above. The technical metadata analyzer 252 performs a number of analysis's on the auxiliary data to determine technical metadata or aspects of the auxiliary data. For example, the technical metadata analyzer 252 may determine the number of phrases (statements), statement lengths (number of characters in the text string), text encoding format, presence, position and length of web-links (URLs strings) within each text statement, pictures encoding format, pictures resolution and/or the like associated with the auxiliary data. Such technical metadata, and any original metadata, is subsequently stored in the central content database along with the re-formatted and filtered auxiliary data.

Once video and auxiliary data have been stored in the content database, the auxiliary content that best matches a particular video may be determined such that the video and auxiliary content (e.g., advertisements) may be displayed on the same screen. Such combinations of video and auxiliary data may be determined prior to any request for the video from users or determined in response to each quest for the particular video. To do so, the video or other multimedia content is first paired with suitable auxiliary content. Subsequently, a suitable presentation layout template is determined for the combined content.

The video or other multimedia content is paired with suitable auxiliary content by a search engine and logical filter 254 via use of a number of data vectors corresponding to metadata of the video and the auxiliary content. For example, in one particular embodiment, the search engine and logical filter 254 is configured to match or otherwise correlate a core content genre tags vector, a clip duration vector, a video clip value rating vector, an auxiliary content genre tags vector, an auxiliary content resource vector, and an advertising data commercial value. It should be appreciated that the boundary condition for such a correlation or matching process including the selection of an amount of auxiliary data that approximately correlates with the video clip duration. For example, a thirty second video clip may require four text messages, each having a length of thirty characters or less.

Figure 12:
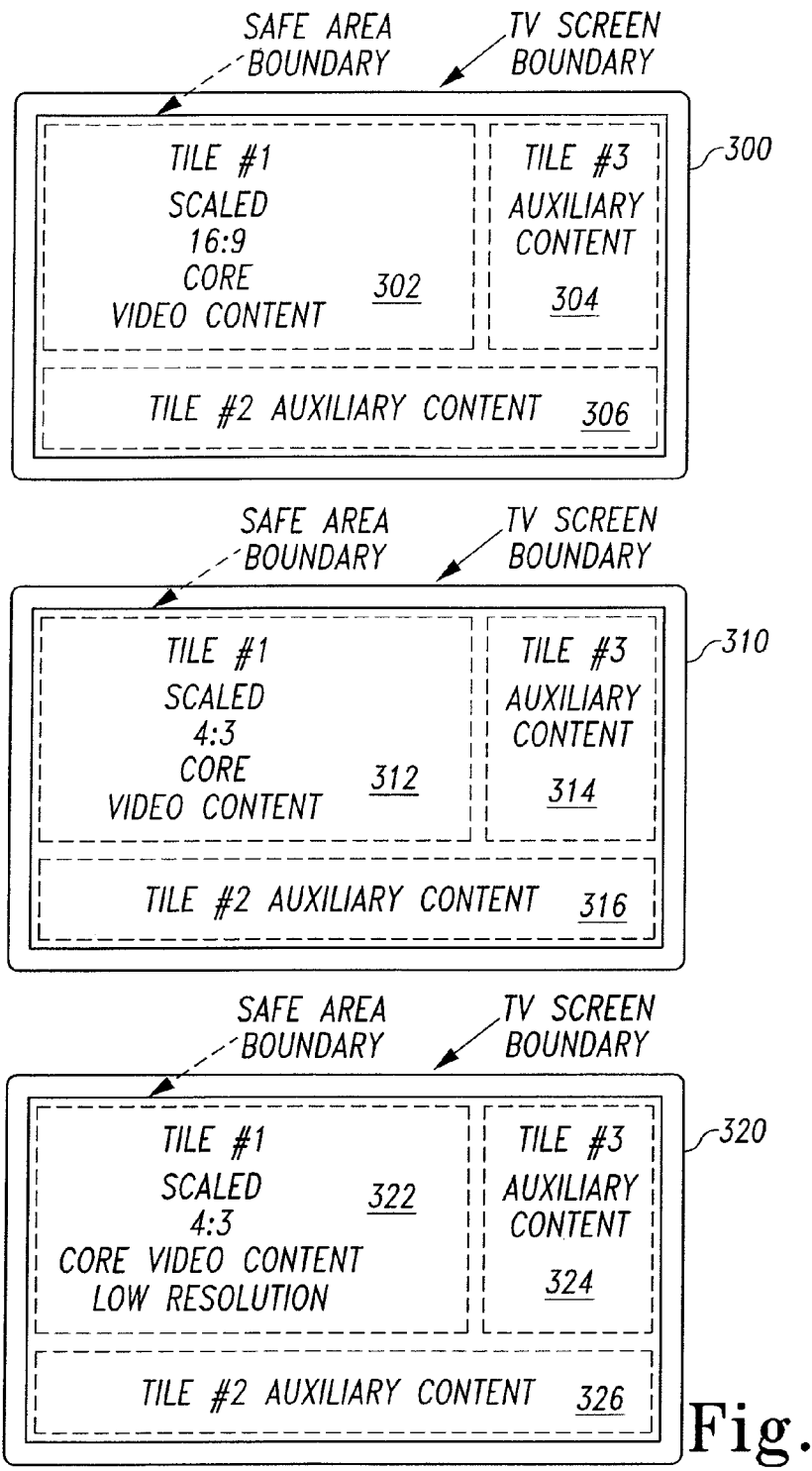
FIG. 12 is a diagrammatic view of a number of presentation templates.

The search engine and logical filter 254 determines one or more auxiliary content IDs matching or correlating to the core video ID. Additionally, the search engine and logical filter 254 generates a template size and position vector 256. The template size and position vector 256 is determined based on the presentation resources vector, the video clip duration, and the video quality rating. The template size and position vector 256 is determined so as to control the allocation of screen area resources, i.e. sizes and positions of the corresponding tiles. As illustrated in FIG. 12, a number of presentation templates may be determined and used based on, for example, the aspect ratio of the core video content. For example, a presentation template 300 may be used in embodiments wherein the core content is determined to have an aspect ratio of about 16:9. In such embodiments, the template 300 includes a core content region 302 wherein the core content is displayed, a first auxiliary content region 304, and a second auxiliary content region 306. The auxiliary content is displayed in the regions 302, 304. Such auxiliary content may be displayed in a static fashion or may be replaced with other advertisements or information periodically during the playback of the core video as discussed previously.

Additionally, in some embodiments, the size of the core content region may be based on the aspect ratio as well as the resolution quality of the core content video. That is, if the resolution quality of the core content video is poor, the video content may be scaled to be displayed in a smaller region so as to improve the playback resolution. For example, a presentation template 310 may be used in embodiments wherein the core content is determined to have an aspect ratio of about 4:3 and is of relatively high resolution quality. In such embodiments, the template 310 includes a core content region 312 wherein the core content is displayed, a first auxiliary content region 314, and a second auxiliary content region 316. Alternatively, a presentation template 320 may be used in embodiments wherein the core content is determined to have an aspect ratio of about 4:3, but be of relatively low resolution quality. In such embodiments, the template 320 includes a core content region 322 wherein a scaled down version of the core content is displayed. The template 320 also includes a first auxiliary content region 324 and a second auxiliary content region 326, which are larger than the regions 314, 326 of the template 310 thereby providing more resources for the auxiliary content.

Referring back to FIG. 11, the search engine and logical filter 254 also determines a template color scheme vector. To do so, the search engine and logical filter 254 matches or otherwise correlates the video color scheme vector (e.g., the RGB values of a selected amount of statistically dominate colors presented within the video clip) with the template color scheme vectors. The template color scheme vectors are determined based on a set of background colors (e.g., background picture set) and associated genre tags, which are stored in the content database 248. For example, a "Saturated Purple-Blue" color scheme may be selected as the suggested color scheme for the "Pop Music" metadata tag, thus generating a set of color scheme vectors related to this particular genre.

The search engine and logical filter 254 also determines a text presentation scheme. The text presentation scheme includes such data as the text font size and the text font color to be used, which are represented in a vector form. The text presentation scheme may be determined based on the template color scheme vector and the template size and position vector assigned to the particular video clip or other multimedia data. That is, the determined text font size and the text font color may be selected so as to produce good readability of the text on the determined background and good subjective perception of the text attributes as suitable for the given color scheme vector and video color scheme vector.

Additionally, text presentation scheme may include certain text presentation attributes such as, for example, a text scroll speed vector, a text presentation time slot vector, and/or a text sub-string length vector. Such additional text presentation attributes are selected so as to allow good readability of the text within the auxiliary content regions of the selected presentation template (see FIG. 12). For example, if the advertisement or information text string size is too big for the TV screen area as allocated by presentation template, the text string may be split into several sub-strings, which may be shown on screen within several subsequent time slots. Alternatively, the advertisement or information text string may be displayed in a scrolling mode within one longer time slot. The selection of the appropriate display option may depend upon such criteria as the availability of the scroll mode (i.e., some hardware/software devices may not support it) and semantic/linguistic analysis of the text statement. For example, some statements may be more easily split into sub-strings than other statements. That is, some statements may be split into sub-strings while preserving the statement's readability and without damaging the logical value of the message Additionally, in some embodiments, particular portions of the advertisement or information text strings, such as Internet links (e.g., the URL or domain name), may be identified and presented in such a way as to differentiate the particular portion. For example, a different font color may be used on those particular portions. Additionally or alternatively, the particular portions may be positioned in a unique location within the allocated auxiliary content region of the presentation template.

In some embodiments, a video processor 260 may spatially and/or temporally scale the selected video clip or other multimedia data in accordance with the selected presentation template (see, e.g., FIG. 12). The scaled video may be optionally inserted into the appropriate core content region on top of a static flat color background in some embodiments. The resulting encoded video stream of full or reduced resolution is then transmitted to the user's set-top box or other playback device. In some embodiments, the video processor 260 may be configured to generate scaled core content video data mixed with the pre-rendered auxiliary data (e.g., advertisements). In such embodiments, the resulting stream of composite video is then transmitted in full (standard) resolution to the user's set-top box or other display device wherein the composite image is decoded and displayed to the end-user.

The determined auxiliary content data, including the selected background picture or color scheme data, is encoded into stream of instructions compliant to one or more data formats by a HTML coder 258. For example, the auxiliary content data may be encoded in a hypertext markup language (HTML) HTML format, a Binary Interchange Format (BIF) format, and/or an Enhanced Television Binary Interchange Format (EBIF). The HTML coder 258 may be embodied as software and/or hardware. The resulting stream of instructions is subsequently transmitted to the user's set-top box or other display device. The stream of instructions are rendered on-screen and combined with the core video data, which is scaled, transmitted, and decoded separately, to thereby form a composite image.

Figure 13:
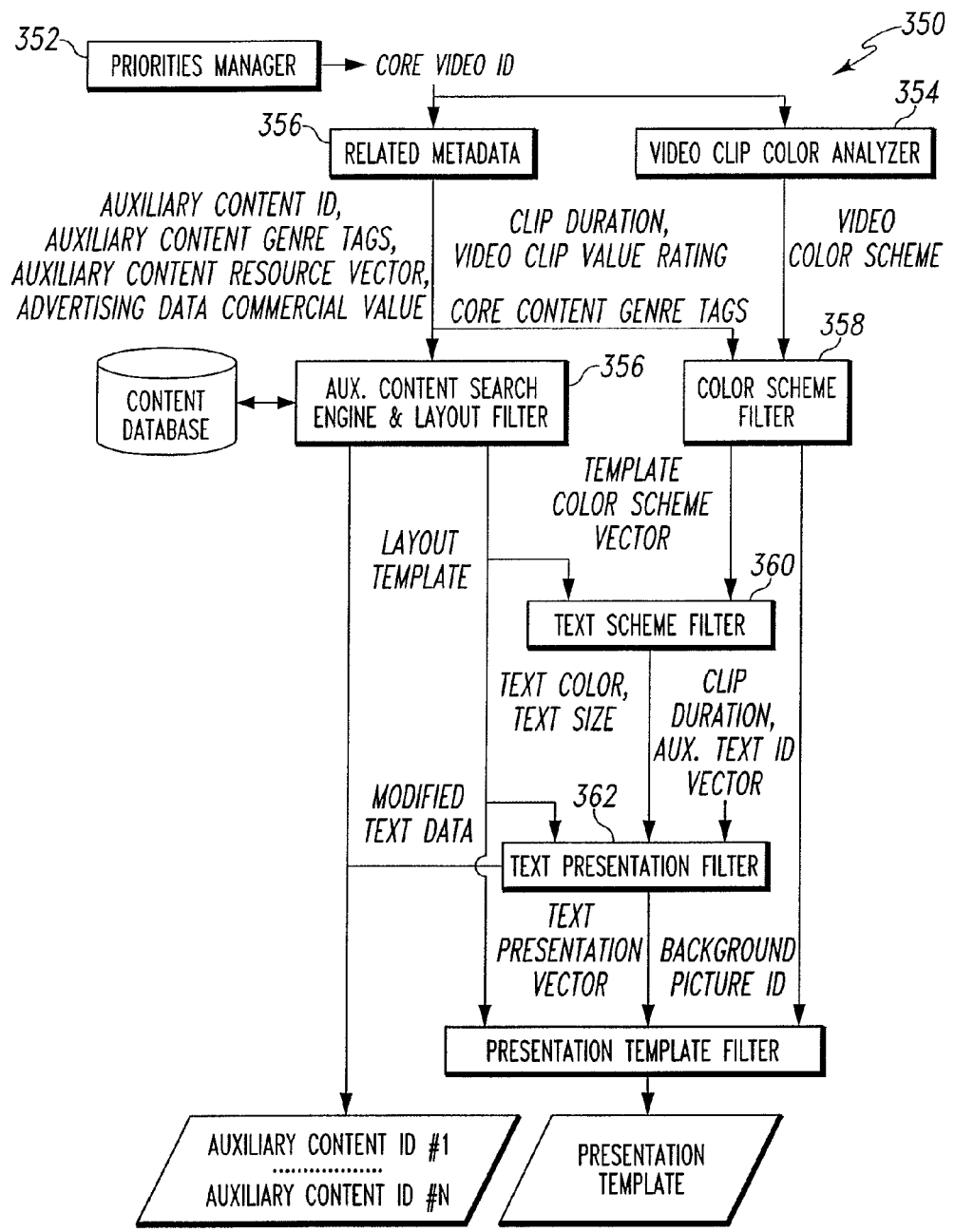
FIG. 13 is flowchart of the process flow one embodiment of the system of FIG. 11.

Referring now to FIG. 13, in one particular embodiment, a flowchart 350 illustrates the process flow of the system 230 for selecting and appending advertisements to multimedia data. The process flow begins with the determination of a core video ID, which is generated by a priorities manager 352. The priorities manager 352 may be embodied as software and/or hardware. For example, the priorities manager 352 may form a part of the video content ingest station 232 described above in regard to FIG. 11. The core video ID is used to identify, collect, and/or derive a set of related metadata including, but not limited to, the video clip duration, the video clip value rating, the video clip genre tags, and the like.

Such metadata tags are subsequently used by auxiliary content search engine and layout filter 356 to determine the auxiliary content ID that matches the genre and duration of the core content. Additionally, as discussed in more detail below, the search engine may be configured to select the auxiliary content ID from a list of generated IDs that is the most profitable (i.e., the ID that has the highest commercial value). Additionally, the video quality parameter is considered during the search process because higher quality videos require more screen area resources, thereby requiring auxiliary content that is less demanding or screen area resources and/or it should be shorter in duration.

The results of the search and filtering process include the auxiliary content ID or list of IDs and the layout template, which defines the sizes and positions of the core content regions and the auxiliary regions (see, e.g., FIG. 12). Additionally, a video color scheme analyzer filter 354 produces a video color scheme vector, which represents the typical colors of the selected video clip or other multimedia. A color scheme filter 358 uses the video color scheme, along with the video genre tags, to derive the template color scheme vector and the ID of the most appropriate background picture. Additionally, the template color scheme vector, along with the layout template, is used to determine the text color vector and the text size vector. It should be appreciated that such data values are represented as vectors in the illustrative embodiments because there are several on-screen text locations and optionally several time slots, each of which may affect text presentation attributes.

The text presentation attributes are further filtered by a text scheme filter 360 and a text presentation filter 362, which may be configured to adjust the text so as to match or correlate to the auxiliary text ID vector and the video clip duration. To do so, the filter 362 may use semantic/linguistic analysis of the texts, possibly splitting text strings into sub-strings and subsequently adjusting the text size vector. The text data as modified by this filter replaces the original text strings determined by the search engine 356 for the corresponding auxiliary content IDs.

The background picture ID, the layout template, and the text presentation vector are provided to a presentation template filter 364. The presentation template filter 364 generates a set of data defining a presentation template. The presentation template, along with the auxiliary content data, contain the components required to build the composite video image on the end-user's television or other display device (expect for the core video data, which is transmitted separately in the illustrative embodiment).

Figure 14:
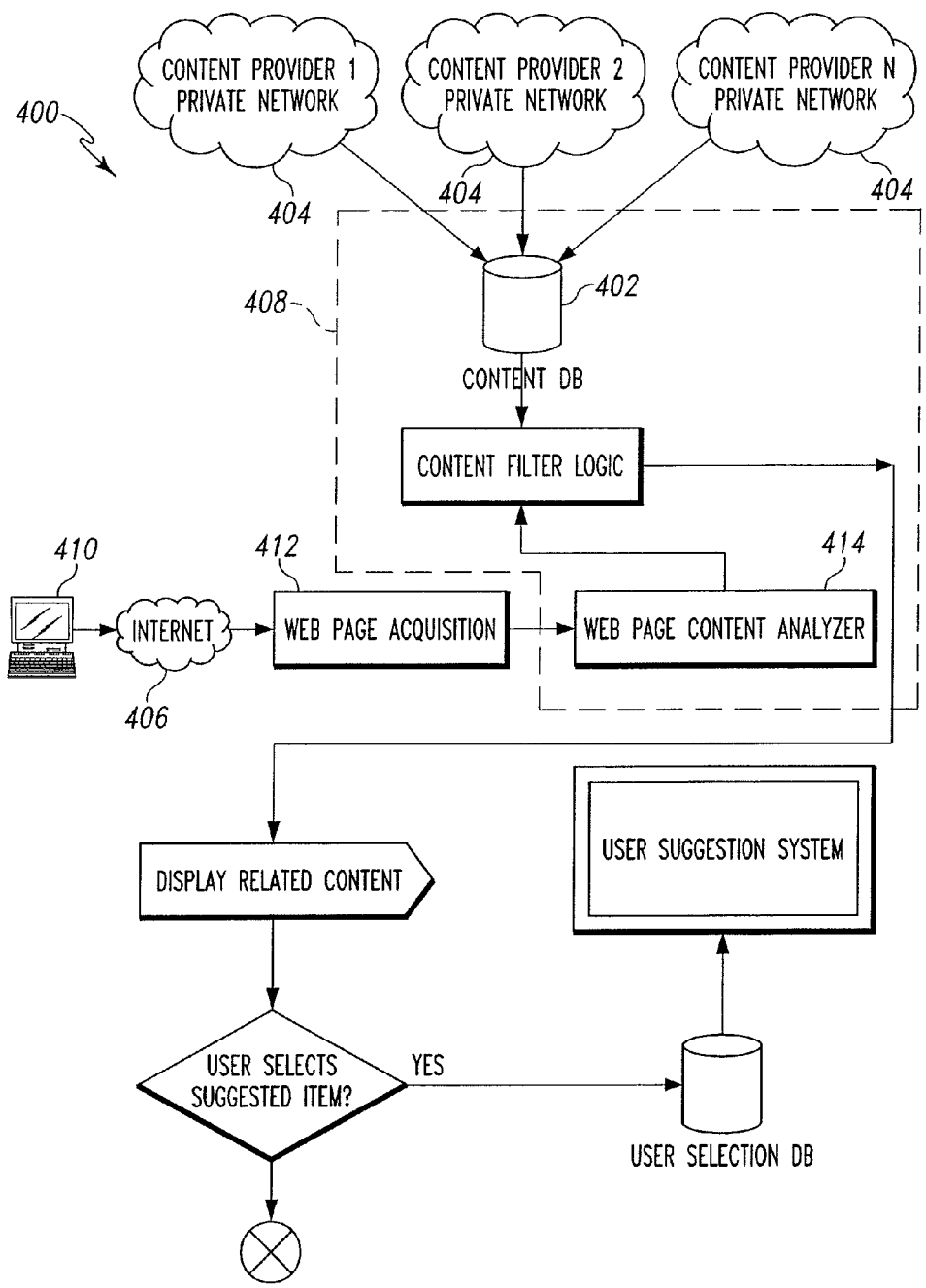
FIG. 14 is a diagrammatic view of a system for suggesting video and other multimedia to an end-user.

Referring now to FIG. 14, a system 400 for suggesting video and other multimedia to an end-user includes a content database 402. Multimedia data such as video, pictures, text, and/or the like are stored in the content database 402 and are accessible by the end-user. To do so, the user may use a search portal to review a searchable index of all video content that can be sent to a user's television. The search portal may be embodied as software and/or hardware stored on a remote server 408 that is accessible by the end-user via a network 406 such as the Internet. The searchable content database 402 may employ intelligent crawling techniques to index video content across a number of networks such as the Internet, which have both user generated and copyrighted content, as well as content provider private networks 404. In some embodiments, the search portal may be accessed directly from an end-user's display device such as the Television. Any search results may be displayed as text as well as thumbnails and/or video previews. The content search may be a live search performed with predictive options, all of which can be provided via visual cues vs. simple text.

For example, the user may enter a selection of search terms. In some embodiments, an advanced search options field (which may be initially hidden) may be used to do more advanced searches such as, for example, searching by video metadata, i.e. actor/director, year, genre. The results page, which is displayed on the end-user's display device, includes the search results, which may be ranked by relevancy. The end-user may view additional details related to the video or other multimedia data by clicking on one of the results. Additionally, other options may be available such as billing options, and selection of quality of the video (e.g. high-definition, standard definition, etc.) If the search was initiated on a non-television device, the end-user may transfer the content to their television to be viewed thereon.

Based on vast amount of video content there is on the Internet that the remote server 408 has indexed and stored in the content database 402, the server 408 may be configured to organize the content into a directory listing. Due to the likely massive amounts of possible categories, the categories themselves may be searchable and sub-searches may be subsequently performed, which are restricted to a selected category. The categories in the directory listing may be dynamically generated from retrieved video and other multimedia from the public and/or private networks 404 and/or from user generated content.

Each end-user registers with the remote server 408. The collection of end-users forms a community, which may share video and other multimedia amongst itself. This majority group may be used for suggesting what the majority finds interesting. However, such suggestion may not be useful for each individual user. Within this community may be "micro-communities," which are groups created under the assumption that members in this group have expressed an interest in a particular topic. By considering both the macro- and the micro-community, the system 400 offers a personalized experience to each registered user.

Each registered end-user may create a profile page. The profile page is completely customizable to allow (and encourage) user creativity. Users, who have made an effort decorating and customizing their profile pages, may share the link to the profile with their friends to get attention.

The profile page may include general information such as the username, age, a photo section to put an avatar, and/or the like. This information may be established during registration via use of a questionnaire that is filled out by the user. The questionnaire may include the sex, martial status, headline quote, and description. Additionally, the questionnaire may include a number of hardware/software questions to facilitate the delivery of media to devices such as a cable television. For example, the questionnaire may include the user's cable company. If the user's cable company and Internet service provider are the same, the system 400 may detect the cable company information from the IP address. The user may then simply confirm the detected settings and/or modify such settings if required.

Additionally, the questionnaire may include other questions directed toward first-run personalization. Such questions may be optional, but each user may be encouraged to answer such questions truthfully to improve the accuracy of video and other multimedia suggestions. For example, the questionnaire may include questions similar to those in the following table.

| Question name | Description | User Value |
| --- | --- | --- |
| Favorite TV Shows | List of favorite TV shows. | User gets a more intelligent suggestion of new media based on similar community members.<br>On first run, display current episodes of these favorite episodes that can be viewed on TV. |
| Favorite Movies | List of favorite movies. | User gets a more intelligent suggestion of new media based on similar community members.<br>On first run after successful registration, display related movies that can be viewed on TV (full versions) |
| Favorite Video Website | e.g. YouTube, Myspace Video | Deliver highest rated video streams from favorite video site right to the user. |
| What I'm watching right now | A URL pointing to the most interesting video clip they have stumbled across. This will be edited easily from the profile so it can be updated often. | Personalization - user can use this video to demonstrate a "mood". This feature may be similar to a "video headline". This video may be shared by the user. The video may be prominently displayed on the |

-continued

| Question name | Description | User Value |
|---|---|---|
| Favorite Genres | A hierarchical list of popular genres, (e.g., sports such as soccer, basketball, cricket, etc.) | profile such that it will be in the attention of profile visitors. Personalization, easy setup to interesting content. |

As discussed above, registered end-users of the system 400 may share video and other multimedia data with other members directly through the system 400. Additionally, the registered end-users may share videos and other multimedia data with non-registered individuals by providing (e.g., via e-mail) the URL of the media to the non-registered individual. The shared content may be embodied as multimedia content stored on the user's personal equipment (e.g., personal computer, set-top box, etc.), in the user's service provider storage facility, in the recipient's storage facility, and/or in a third-party providers storage facility. As such, the shared content may be shared in a "cross-provider" manner. The videos and other multimedia may be shared using any device configured for such as purpose including, but not limited to, personal computers, televisions, and/or mobile phones. In such devices, specific sequence of keys may be programmed accomplish the sharing with selected other registered end-users.

For example, when a registered end-user is viewing video that was delivered to their television via the system 400, the end-user may press a series of buttons on the television remote to thereby trigger a process to automatically transmit the selected video to a predetermined member's device (e.g., television, mobile phone, personal computer, etc). Additionally or alternatively, the selection of keys may be configured to send the video or other multimedia to a group of registered users and/or to send the URL of the video or other multimedia to one or more e-mail addresses. For example, in some embodiments, the registered end-user may press a button to pull up a list of all contacts (registered members and email contacts) and select those individuals with which the video is to be shared. For example, user may scroll down the list of contacts and select one or more recipients therefrom using the television remote control or other input device. If the selected recipient is also a registered user, the contact information (e.g., e-mail address) of the recipient may be determined by the system 400 from the user profile of the recipient. As such, it should be appreciated that, in some embodiments, the user need not know the current e-mail address or other contact information of the recipient. Rather, the user may share content with other registered uses via selection of an appropriate button or buttons on the television remote control or other input device.

In one particular embodiment, the contacts of the user may be allocated to one of three different contact lists. For example, a first contact list (e.g., a "tight community" contact list) may include individuals that particularly close to the user. For example, the first contact list may include the friends and family of the user. Each contact list may have varying levels of permission. For example, the first contact list may be allowed to view private photos and/or video of the user, which may be stored on the user's playback device (e.g., television, personal computer, mobile device, etc.), in the user's service provider's storage facility, and/or in another location. A second contact list (e.g., a "loose community" contact list) may include individuals known to the user but not particularly close to the user. For example, the second contact list may include individuals that attend the same school or participate in the same activity as the user. A third contact list (e.g., a "broad community" contact list) may include individuals unknown to the user. For example, the third contact list may include individuals that are interested in a particular subject. The user may create as many contact lists as desired. For example, the user may have any number of "loose community" contact lists.

The user may share content with each member one or more contact lists. For example, the user may share private photos with the "tight community" contact list and public video with the "loose community" contact list. When the user shares content with a "tight community" or "loose community" contact lists, the system 400 retrieves and reviews the user profiles of the sending user and each recipient of the contact list. The multimedia content is then processed (e.g., scaled and/or transcoded) into a format that is viewable by each particular recipient of the list based on the recipients user profile (i.e., the technical data related to the recipients playback device). Such processing may be accomplished by a set of filters or other devices included in the system 400, but external to the playback device and residence of the user. As such, the user is able to share content without the need or burden of processing the video or otherwise ensuring that the video is viewable by the particular recipient because the processing is handled by the system 400.

The user may also share content with a "broad community" contact list. If so, the system 400 retrieves an reviews the user profile of the sending user and uses a generic profile for the recipients. The generic profile causes the video clip or other multimedia data to be processed into a generally acceptable format. Of course, such generally acceptable format may or may not be the ideal format for playback of each recipient. To deliver such content globally, the system 400 uses a number of factors or criteria to determine the best generic format of the content. For example, the system 400 may consider the service provider of the sender and the service provider of the recipient. Additionally, the system 400 may consider the connectivity or throughput bandwidth between the sender and the recipient and any applicable file size restrictions. For example, if the sender and recipient are using the same service provider, the bandwidth usable to send content may be large. However, if the sender and recipient are using different service providers or are located in drastically different geographic locations, the bandwidth usable to send the content may be small or smaller. In such embodiments, the multimedia content may be processed to ensure that the recipient is able to receive the content. For example, if the multimedia content is embodied as a video, the video size and compression rate may be adjusted such that the total size of the video file is reduced.

It should be appreciated that the system 400 allows a user of the system to share multimedia data using the user's television. As such, the user may send and receive videos and other multimedia data via the user's television and/or set-top box. The user may control the sending and receiving or otherwise interact with the system 400 via use of the television remote control. For example, the user may share video content or other multimedia data with a recipient that is using a personal computer or mobile media device to view the content. Similarly, the user may view or otherwise consume content that was sent to the user via a sender using a personal computer or mobile media device.

Of course, the recipient of the content from the original user may also share the content with other recipients (either registered or non-registered users). For example, the recipient may forward the link or video to other recipients. If the next recipient is also a registered user, the first recipient may share the content by selecting the recipient from the list displayed on the first recipient's display device (e.g., television). Alternatively, if the next recipient is not a registered user, the first recipient may supply the contact information for the subsequent recipient.

The content forwarded by the user of the system 400 may be unmodified or, in some embodiments, may be forwarded in a modified form. For example, if the user determines that a particular portion of the video or other multimedia is of interest, the user may apply start and stop markers to the video. The user may apply the start and stop markers using, for example, the remote control of the user's television or other input device. The user may then review the modified video in a loop fashion wherein the video defined by the start and stop markers is repeated. Additionally, the user may send the modified video (e.g., the original video along with the defined start and stop markers) to users and non-users of the system 400 as discussed above. As such, the recipient may view the video clip beginning at the start marker to the stop marker as defined by the original user. Further, the user may modify the original resolution and/or format of the video clip. For example, if the user is viewing the video on his or her television and desires to send the video to a contact person having access to a personal computer, the friend may send a link to a lower resolution copy of the original video such that the contact person may view the video on his or her personal computer at the lower resolution so as to save bandwidth.

In addition to videos and other multimedia data, the registered users may share advertisements in the same manner as other media. The receiving registered user has the opportunity to rate the usefulness of this advertisement. Such ratings may subsequently be used to target other advertisements sent to this particular user.

To promote the sharing of advertisements, sharing incentives such as referral bonuses to users that share advertisements may be used. Such sharing incentives may include some monetary value. Additionally, such sharing incentives may include points or other "tokens". In some embodiments, such points or tokens may be subsequently redeemed by an end-user for purchasing items from a catalog. Such items may include any type of products such as access to copyrighted media libraries. The distribution of the points or tokens may be configured in any one of a number of configurations. For example, fractions of a referral bonus may be given to every member who passed the particular advertisement. That is, if registered user A shares an advertisement with registered user B, who subsequently shares the advertisement with registered user C, who subsequently purchases the advertised product, the users A and B may receive points or tokens.

Additionally, registered user may purchase products based on an advertisement delivered to their viewing device, and automatically send the products to one or more individuals. For example, the system 400 may allow the end-user to send the gift anonymously. The payment option for the purchase may be accomplished via a secure credit card transaction. The receiver of the gift is subsequently notified on their viewing device and may either accept or reject the gift. Because the system 400 knows the gift recipient's address from the initial registration process, the gift may be sent to such address without any further action on the part of the purchaser.

The system 400 is configured to learn from each gift referral. That is, the system 400 may store metadata describing each gift. Additionally, the system 400 may be configured to monitor for special dates, such as birthdays. When the special date approaches, the system 400 may be configured to notify registered and identified friends of the end-user. Additionally, the end-user may request to be notified on the approach of special dates such as birthdays of friends, anniversaries, and/or the like. The system 400 may be configured to suggest particular gifts based on the end-user's basic demographic information, location, age, sex, and/or the like. Such gift suggestions may also be fine tuned by cross-referencing the suggestions with the history of the type of gifts and advertisements the end-user has accepted.

The system 400 may also be configured to provide other services to the user via the user's television or other viewing device. For example, the system 400 may be configured to provide mapping services such that the user can view a map of a desired region, city, or the like. Mapping functions such as traveling directions and distance calculation between two points may also be provided. Additionally, in some embodiments, location services of individuals equipped with a global positioning system sensor or device. For example, the location of the individual may be displayed to the user on a map or the like via the user's television. Additionally, the system 400 may provide other services to the user via the user's television that are typically accessible or otherwise provided for use on a personal computer such as, for example, a messaging service, e-mail service, and other services.

It should also be appreciated that the user of the system 400 may use their television to update and/or maintain the user profile associated with the user (i.e., without the use of a personal computer). For example, in some embodiments, the user may attach a universal serial bus (USB) video camera to a universal serial bus port of the user's set-top box and store an picture of the user via selection of an appropriate button on the user's television remote. The user may then select another button to cause the user's picture to be uploaded to the system 400 and stored in the user's profile. Of course, the user may share the user's picture with other user by uploading the picture to the user-generated data storage of the system 400.

Registered users of the system 400 may also create their own channels (i.e., a collection of video clips or other multimedia data). Such channels provide means for users to organize their media across various video sites on the Internet. For example, a registered user may create a channel called "Comedy" in which comedic videos are placed. Subsequently, the registered end-user may access this channel from the user's television or other viewing device to view the videos. Additionally, the community of registered end-users may rate the channels created by other users. The highly rated user defined channels may then be promoted prominently to other registered members, which are available by the other registered members and may be transmitted to the other registered members media viewing devices. The community of registered end-user's may also update and/or modify the list of videos or other multimedia that define each channel. As such, various communities of end-users may share lists of videos and other multimedia, which may be modified over time.

In the system 406, each user may be represented by a vector of media items that the user has marked as interesting or has otherwise viewed in the past. By comparing this list of media items between users, the system 400 may determine a similarity score between the users. With a score above a certain threshold, the system 400 may be configured to determine that the particular users have similar media tastes (and the delta between these vectors may be of interest to the other users). For example, the users may be described based on genres as follows:

User A: [(Genre 1), (Genre 2), (Genre 4), (Genre 5)]
User B: [(Genre 1), (Genre 2), (Genre 3), (Genre 6)]

As shown above, user A and B both have Genres 1 and 2 in common. Accordingly, the system 400 may determine that the users have similar tastes. As such, the system 400 will use the vector defining user A to suggest Genre 4 and 5 to user B and the vector defining user B to suggest Genre 3 and 6 to user A.

As discussed above, the system 400 is configured to suggest video and other multimedia to an end-user. To do so, the system 400 monitors video and other content viewed by the user. As discussed above, the user may use a search portal to review a searchable index of all video content that can be sent to a user's television. Again, the search portal may be embodied as software and/or hardware stored on the remote server 408 and/or on the user's client machine 410. For example, in one embodiment, monitoring software is initially downloaded from the remote server 408 and execute on the client machine 410. The software is configured to "listen" for activity on the user web browsing sessions and suggest videos to the user when the user visits a web page that is relevant to a video that can be accessed by the system 40 and transmitted to the end-user (e.g., from the content database 402 or from a content provider). For example, if a user is on a web site dedicated to movie reviews viewing a particular movie, the system 400 may be configured to whether the system 400 can deliver either that exact video or movie to the user, or videos related to such movie video.

As shown in FIG. 14, the remote server 408 initially receives data from the user's web browser indicating that the user is visiting a new web page. In response, a web page acquisition process 412 is initiated to transfer the currently viewed web page to the remote server 408 over the network. The web page content is subsequently provided to a web page content analyzer 414. The content analyzer determines if the content is related to a video stored in the content database 402. The content of web page is further provided to a content filter logic 416 configured to extract keywords and any metadata tags from the document, embedded video, and/or the like. The content filter logic 416 may use, for example, a selection of natural language filters. The keywords are subsequently used to search the content database 402. The video results are returned in order of highest relevance in regard to the keywords and are presented to the user. If no matches are available, the process may exit or otherwise provide notification of such to the user.

When a user receives the results of the content search, the user may select the video to view it. Such selection action is subsequently stored in a user selection database (which may form a portion of the content database 402). The user selection database is used to help group users in terms of viewing similarity as discussed above. Additionally, the user may request a random selection of video clips and/or other multimedia for viewing and/or consumption. For example, the user may request a random selection of video clips within a predefined time limit and/or according to other various criteria. The user may request, for example, up to fifty minutes of video clips of soccer matches played in England between the time period of 1960 and 1980.

As discussed above, each registered user may create any number of "channels" (i.e., collection of videos and/or other multimedia content). A channel is a collection of such videos or other data that a user describes with metadata. The channel may be populated with content by the user and/or by the system 400 using the metadata tags. The channel may be delivered as a stream of media to the user's media viewing device. The metadata tags defined by the user may include, but are not limited to, the genre, actors, preferences, and other data capable of identifying useful media. The system 400 may be configured to populate the channel with new content at predefined intervals (e.g., once a day, once a week etc). Archives of such channels may also be stored in the content database 402 or other database and be accessible and shareable by the user.

Each end-user may individually rate each piece of media in a channel, which may influence future media added to the channel. A registered user may also access channels of users who have similar (but not the same) channel settings the registered user to view and consider new media contained therein. Additionally, the system 400 may use the user profile comparison described above to suggest channels that may be of interest to the particular registered user based on such comparison.

The system 400 may also be configured to deliver web based notifications (e.g., a new email, notifications on social networking sites, really simple syndication (RSS) based news streams, meeting notices, etc.) to the end-user's personal computer and/or other media viewing devices through the end-user's personal computer. The notification delivery system may be configured to poll the services that the end-user has selected. On any new notification, the notification delivery system may deliver a message to a web service indicating that there are new unseen notification messages. The media viewing device's software may be configured to poll the web service to determine if there are any new notifications. If the web service responds that new messages are available for the user, the media viewing device may request to retrieve them. In response, the web service is configured to transmit the notifications to the media viewing device, which subsequently displays the notifications to the user.

Figure 15:
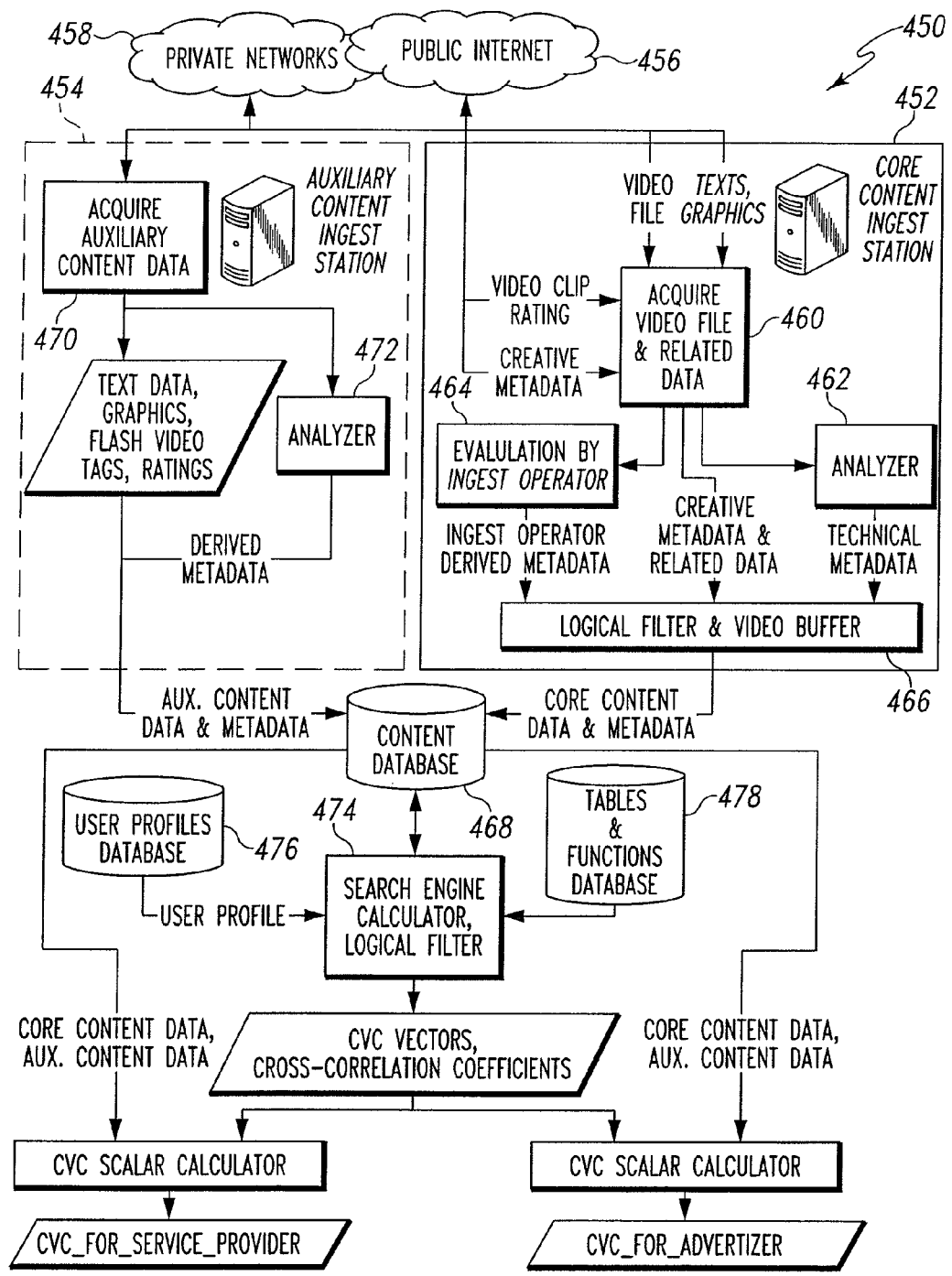
FIG. 15 is a diagrammatic view of a system for determining a value of content.

Referring now to FIG. 15, a system 450 for determining a value of core content such as a video or other multimedia data and/or a value of auxiliary content such as advertisements is illustrated. The core or multimedia content value includes the past, present, and future commercial or cultural value of the piece of multi-media content for some particular group, business entity, or group of entities. A variety of factors may be considered in determining the value of a piece of multimedia. For example, the technical parameters/features/metadata of the content may be considered. That is, a high definition video clip having little noise may have greater value than a low-resolution, heavily compressed video. However, the value of the wide-screen high definition video clip for people without HDTV receivers is not as great because the video must be down-converted and may include resulting black bands above and below the core video. Further, if there is no down-converted version available, the high definition content may have no value for this category of users (i.e., users without HDTV). As such, it should be appreciated that the content value is typically not absolute, but rather depends on a number of factors that may change over time. Hence, the value of the multi-media content may be seen as a dynamic vector with multiple dimensions rather than a static scalar.

However, for use with particular devices (such as in a video-on-demand device or broadcast service), the core content value may be expressed as a scalar coefficient to facilitate processing of videos. Such a scalar coefficient may be determined by, for example, projecting a current sample of the above mentioned dynamic vector on the vector of interest of a particular service provider or particular user. The resulting content value coefficient may subsequently be used for searching, selection, and/or prioritization of the highly valuable pieces of content.

As discussed above, the value of a particular piece of multimedia may be temporal based. That is, the value of interest may be a future value or a predicted value. For example, to a particular business entity, the value of interest of the core content may be the estimation of expected interest of the end-users in the particular piece of content (i.e., the predicated value of the content). To determine the predicated value of the core content, the end-user's answers to a preference questionnaire form as discussed above may be analyzed. Additionally, the viewing histories and/or habits of the end-users may be analyzed including other observed behavior such as, for example, phone calling patterns, web surfing patterns, credit cards usage pattern, travel patterns, and the like.

Once the core content values has been determined for a particular user, the core content value for groups (e.g., household of the user, geographical area such as the city of the user, etc.) to which the user belongs may be estimated. For example, for commercial applications, the core content value may be determined for a particular target audience, which can be found by sub-dividing the audience into target groups of viewers. Such groups can be defined by a specified location, age, ethnic origin, religion, cultural level, habits, etc. For example, sociographic tags may be used such as General Public, New-Yorkers, Teenagers, Pet-Lovers, Non-smokers, and the like.

The core content value of the particular pieces of content may be integrated within the specified multi-tagged group (e.g., all available video clips suitable for the given category of viewers). For example, the aggregate core content value for a selected group of video clips (e.g., pop-music dated before 2000) that are available in the local service provider repository and which targets some particular users group may be determined.

As such, the core content value may be determined for a diverse group of users and/or service providers. For example, the core content value may be embodied as estimation of the value of any audio/video content from any source, including Internet websites, for a user (subscriber) viewing this content on a regular consumer TV screen. Additionally, the core content value may be embodied as an estimation of the ability of the core content to attract more viewers of a specified type. Similarly, a value of auxiliary content (e.g., advertisements) may be embodied as an estimation of the ability of the auxiliary content to generate more sales. As such, the core content value and/or the auxiliary content value may be used in the creation of a composite image matching the individual profile of a particular user and combining specific information and/or advertising data with the core video content.

To do so, the system 450 may be used to calculate the core content value and/or the auxiliary content value. The system 450 for determining values of core and auxiliary content includes devices and steps similar to the system 230 described above in regard to FIG. 11. As illustrated in FIG. 15, the system 450 includes a video or other multimedia ingest station or server 452 and an auxiliary or advertisement content ingest station or server 454. Each of the servers 452, 454 are configured to search or otherwise receive content from any number of public networks 456, such as the Internet, and private networks 458. To do so, each of the servers 452, 454 execute a number of algorithms. For example, in regard to the video ingest server 452, the server 452 retrieves video and other multimedia data from the public network 456 and the private network 458 in a process step 460. Such video and other multimedia data may include video data, text, and other graphics such as pictures or the like.

Additionally, the video ingest server 452 may also retrieve various metadata related to the retrieved video. For example, the video ingest server 452 may retrieve video clip ratings, information regarding the authors of the video, additional information regarding the video itself such as subject matter, participants or actors, locations, and so on. It should be appreciated that the additional metadata related to the retrieved videos and other multimedia data may be retrieved contemporaneously with the video, retrieved prior to video, or retrieve at a later time. For example, in embodiments wherein the video ratings are retrieved contemporaneously or at a later time relative to the video, the videos may be stored and subsequently classified. For example, the videos may be stored according to the priority class (e.g., first tier, second tier, third tier, etc.). Alternatively, in some embodiments, the video ratings may be received first such that the retrieval of videos may be prioritized based on such ratings.

In some embodiments, the video content ingest server 452 may access a user profile database (e.g., database 128 as described above in regard to FIG. 6). The user profile database may include "tags" or other data that identifies the type of video or other multimedia preferred by each user. Such preferences may be aggregated such that the preference of the user base, as a whole, can be determined. Subsequently, the retrieval of the videos and other multimedia data may be prioritized based on the preferences of the user base. That is, the preferences of the users may be compared to the metadata associated with each video clip or other multimedia data to determine the priority of the particular video. The videos may then be retrieved according to the order of priority. The retrieval and/or classification of retrieved videos and other multimedia data may be further refined or modified based on the video ratings, other metadata, popularity of the retrieved video among the user base, and/or the like. As such, the collection of videos and other multimedia data will correlate to the preference of the user base.

The retrieved video or other multimedia data, along with any associated metadata, is subsequently provided to a logical filter and video buffer 466. Additionally, the retrieved video or other multimedia data is provided to a technical metadata analyzer 462. The technical metadata analyzer 462 performs a number of analysis's on the video or other multimedia content to determine technical metadata or aspects of the video. For example, the technical metadata analyzer 462 may determine the encoding format, picture resolution, frame rate, picture aspect ratio, presence of "black bands, the audio and/or video signal levels, noise, blockiness, sharpness, color, and/or the like of the video. Such technical metadata is also provided to the logical filter and video buffer 466.

In some embodiments, the retrieved video or other multimedia data may also be evaluated by an operator of the video content ingest server 452 in a process step 464. The operator may provide subjective quality rating data and aspect ratio data of the video or other multimedia data. Such subjective data may or may not match the results of the automatic analysis performed by the analyzer 462. Additionally, any copyright issues (e.g., digital rights management) are addressed in process step 464. To do so, metadata extracted from the video file header (e.g., the genre and any copyright data) or derived therefrom may be used. For example, if it is determined that the video or other multimedia data may infringe on the copyright of the owner, such video may be deleted from the system 430 and flagged accordingly such that the video is not retrieved at a later date.

The logical filter and video buffer 446 converts all incoming data into the format suitable for storage in a content database 468. Additionally, any conflicts or erroneous data associated with the video or other multimedia data may be flagged, replaced with default values, or otherwise reconciled. The re-formatted and filtered video data or other multimedia data along with any metadata including the technical metadata determined by the analyzer 462 are stored in the content database 468.

Referring back to the auxiliary content ingest server 454, the server 454 retrieves auxiliary data from the public network 456 and the private network 458 in a process step 470, which may occur contemporaneously with the retrieval of video data by the video content ingest server 452. Such auxiliary data may include advertisements and other informative data, which may be embodied as text and/or graphical objects including static and/or dynamic images. The retrieved advertisements and other informative data are potentially suitable to match the video and other multimedia data retrieved by the server 452. The prioritization of the acquisition of auxiliary content data may be based on such factors as the commercial advertising rates and similar general business parameters. Additionally, the prioritization of the auxiliary content data may be based on the statistics of registered user profile data, users' explicit requests, and/or users' implicit demand, which may be estimated in accordance with the users' preferences and/or viewing history.

The retrieved auxiliary data is provided to a technical metadata analyzer 472, which may be similar to the analyzer 462 described above. The technical metadata analyzer 472 performs a number of analysis's on the auxiliary data to determine technical metadata or aspects of the auxiliary data. For example, the technical metadata analyzer 472 may determine the number of phrases (statements), statement lengths (number of characters in the text string), text encoding format, presence, position and length of web-links (URLs strings) within each text statement, pictures encoding format, pictures resolution and/or the like associated with the auxiliary data. Such technical metadata, and any original metadata, is subsequently stored in the central content database along with the re-formatted and filtered auxiliary data.

Once video and auxiliary data have been stored in the content database, the auxiliary content that best matches a particular video may be determined such that the video and auxiliary content (e.g., advertisements) may be displayed on the same screen. Such combinations of video and auxiliary data may be determined prior to any request for the video from users or determined in response to each quest for the particular video. To do so, the video or other multimedia content is first paired with suitable auxiliary content. Subsequently, a suitable presentation layout template is determined for the combined content.

The video or other multimedia content is paired with suitable auxiliary content by a search engine and logical filter 474 via use of a number of data vectors corresponding to metadata of the video and the auxiliary content. For example, in one particular embodiment, the search engine and logical filter 474 is configured to match or otherwise correlate a core content genre tags vector, a clip duration vector, a video clip value rating vector, an auxiliary content genre tags vector, an auxiliary content resource vector, and an advertising data commercial value. It should be appreciated that the boundary condition for such a correlation or matching process including the selection of an amount of auxiliary data that approximately correlates with the video clip duration. For example, a thirty second video clip may require four text messages, each having a length of thirty characters or less.

Further, the video or other multimedia content is paired with the auxiliary content based on the calculation of the value of the core video content and the auxiliary content. To do so, the values of the core content and the auxiliary content is calculated as current samples of the pre-defined functions, expressing the dependence of the content value from individual person (or group), time of show, location of the potential viewer(s), content genre, etc. As such, the search engine, calculator, and logical filter 474 is communicatively coupled to a user profile database 476 and a tables and functions database 478.

To determine the match between the selected core content and the one or more auxiliary content, the selection process is configured so as to maximize the aggregate value of both of the core content and the auxiliary content. In one embodiment, such a search or selection process may be recursive. The search or selection process may include several iterations and multiple search queries, which may require multiple calculations of core/auxiliary content values for different combinations of core and auxiliary pieces of content.

In one particular embodiments, to determine the value of the core content and the one or more auxiliary content, the following equations are used:

$$CVC\_Clip\_Interest=function\_Interest(p, i, t, g)$$
$$CVC\_Clip\_\$\$=function\_\$\$(t, ii, l, a)$$
$$CVC\_Clip\_Cultural=function\_Cultural(t, ii, p, l)$$
$$CVC\_Ad\_\$\$=function\_Ad\_\$\$(t, ii, p, l)$$
$$CVC\_Adv=F\_Adv(MATCH(p, a))$$
$$CVC\_Adv\_TBP=CVC\_Adv \times No\_Of\_Viewers$$

wherein CVC_Clip_Interest is an estimation of the interest level in the core content video of a particular entity (user, group, locality, etc.), CVC_Clip_$$ is an estimation of the monetary value of the core content video of a particular entity, CVC_Clip_Cultural is an estimation of the cultural value of the core content video of a particular entity, CVC_Ad_$$ is an estimation of the monetary value of the auxiliary content to a particular entity, CVC_Adv is an identifier of the auxiliary content to be matched with the core content video, CVC_Adv_TBP is an estimation of the total value of the core content video for a particular broadcast service provider, l is an identifier of a particular locality, p is an identifier of a particular individual, i is an identifier of interest level, ii is an identifier of the integral of the interest level, t is an identifier of a particular length of time, g is an identifier of a particular type of genre, and a is an identifier of an advertisement type.

The search engine, calculator, and logical filter 474 may avoid unnecessary calculations in the above equations by sorting-out less relevant factors, using pre-defined appreciation/depreciation functions, and pre-ranking the variables in order of importance. For example, if a partial value calculation along one of the important variable axis results in a perceived low value, the process of further calculations may be aborted and the corresponding core/auxiliary content value may be set to "Low". For example, if the "location" test shows that there are few users at a particular location interested in a particular type of content, the process may be aborted prior to completion. Such aborted calculations may be taken in those situations wherein the assumed content presentation time is far away from the optimal date/hour, defined by Appreciation/Depreciation function for this piece of content. Depreciation may be caused by, for example, poor match between Clip_Tags and Ad_Tags (e.g., MA-rated content with the Ads targeting schoolchildren). In some embodiments, the advertisers may provide recommendations about Locality, Age Group, Ethnic Group, etc. of interest.

The search engine, calculator, and logical filter 474 may create a match table in the selection of auxiliary content. For example, the match table may include two columns sorted by value: CVC_A (for Ads) in monetary currency and CVC_C (for Core Content) in Interest (Probability 0 . . . 100).

Such values may be sorted in descending order and matched from top to bottom to generate a candidate vectors for possible matches. Additionally, other factors or criteria may be considered in the selection process. For example, technical factors such as video clip duration may impact the selection process. For example, the choice may be between (i) a single high interest movie and high monetary value auxiliary content that has a weak matching to the movie and (ii) several shorter clips and moderate monetary value auxiliary content that has a strong matching to the clips.

Once the selection process has been completed, the search engine, calculator, and logical filter 474 generates a set of value vectors, the components of which represent values of particular bits of core and auxiliary content for particular business parties, such as viewer, service provider, advertiser, and so forth. Because the Aggregate Value of the content set can be higher or lower than the simple sum of the values of the components, cross-correlation coefficients are assigned for each of the components of the optimized content set. For example, a high value Olympic Games News video may have an especially high value for the advertiser of sport products, but a medium or even low value for the advertisement of pet-food products.

Next, the correlation coefficients are applied to the previously calculated value vectors. The projection of these vectors to the Axis of Interest of particular business parties is subsequently performed. The resulting scalar core/auxiliary content values directly express the values of the analyzed pieces of content for the relevant parties. For example, one of the content value scalars may show value in dollars of the Olympic Games News video clip for the Advertiser of jogging trousers in Bronx area at 9 pm on 27 of August. Another content value scalar may show dollars value of the single jogging trousers advertisement presentation for the Service Provider. A further content value scalar may show the Interest Value (in percents) of the said Olympic Games News video clip for the average 40-years old male user in Bronx.

Figure 16:
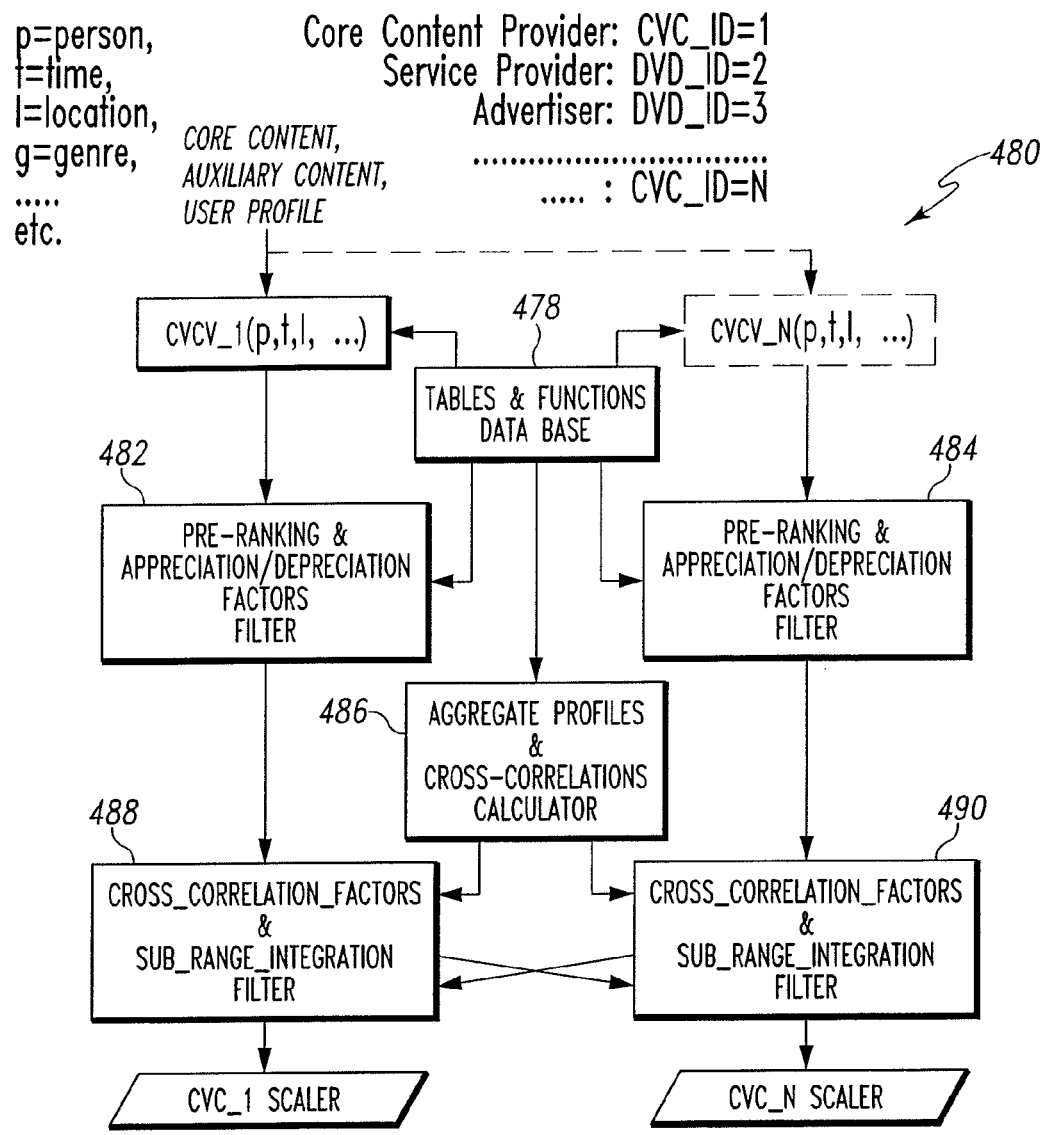
FIG. 16 is a flowchart of the process flow one embodiment of the system of FIG. 15.

Referring now to FIG. 16, the data workflow 480 of the content value calculator 474 is illustrated. The content values are calculated by initially assigning the arguments for the pre-defined set of table and functions, which are stored in the tables and functions database 478. Subsequently, in process steps 482, 484, the pre-ranking and Appreciation/Depreciation calculations are performed. The pre-ranking and Appreciation/Depreciation calculations are used so as to exclude unnecessary processing of obvious or nearly obvious cases as described previously.

The aggregate profiles and cross-correlations calculator 486 is configured to increase the speed of calculations by replacing individual profiles with "typical" profiles for a particular category of users. The aggregate profile is calculated for each piece of content separately as a non-linear weighted mix of individual user profiles. The weighting coefficients and thresholds, as well as the cross-correlation coefficients, are functions of location, genre, and other variables.

Subsequently in process steps 488, 490, the cross-correlation coefficients are applied to the content value vectors as calculated previously. Next, the result of such application is integrated across the relevant range of variables. For example, the location variable range can be set to single user, household, city area, whole city, or even several countries. The speed of the integration process for a large set of users (e.g., several million users) may be increased by not repeating identical calculations. Rather, partial or global aggregate profiles may be used. Once all of the calculations are completed, a set of value scalars are generated. Each scalar represents the value of the analyzed pieces of content for the parties involved. The number of actual outputs of the system 450 (i.e., the number of processed scalars) may be adjusted as needed.

Figure 17:
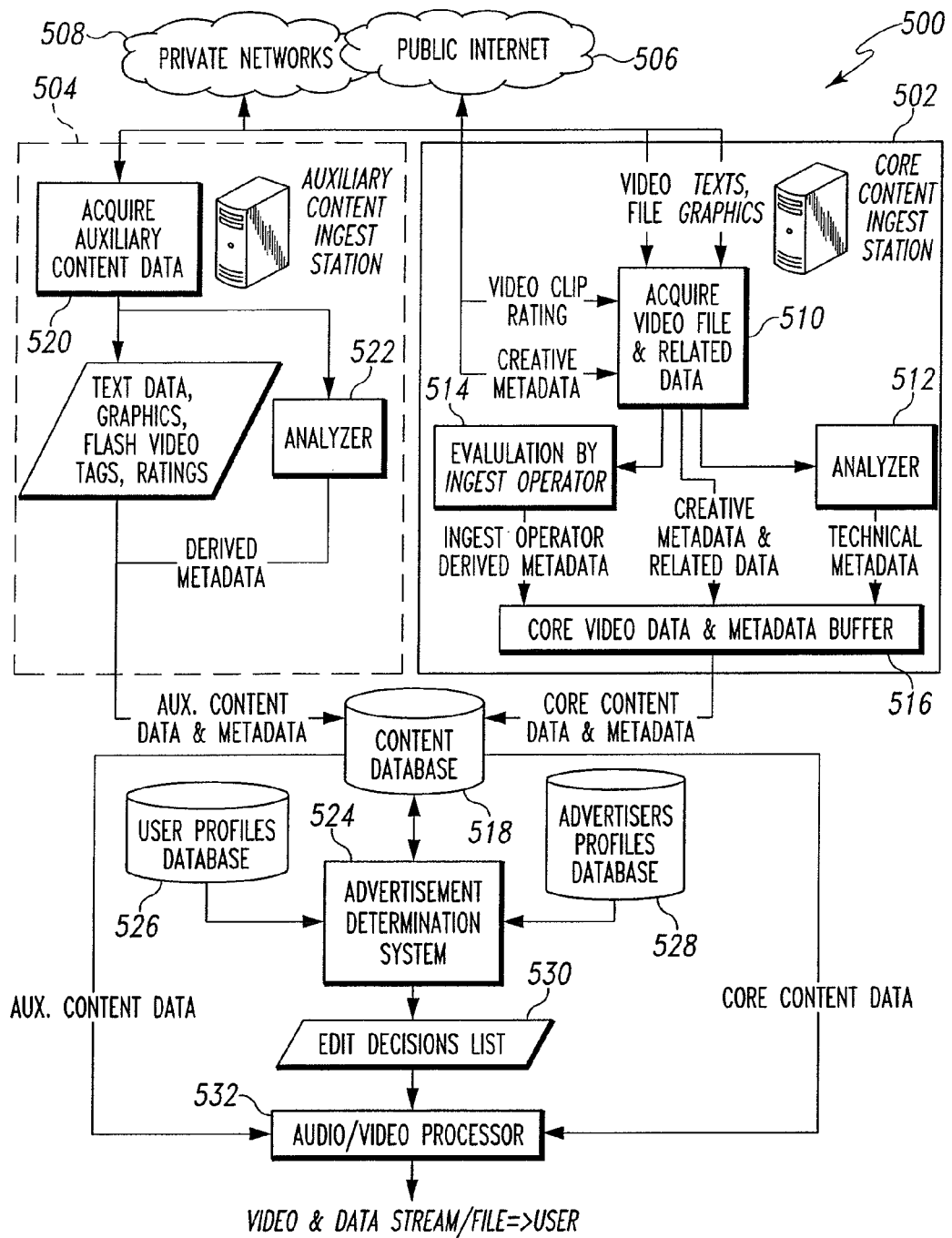
FIG. 17 is a diagrammatic view of a system for selecting an advertisement based on a number of bids for a particular advertisement resource.

Referring now to FIG. 17, a system 500 for selecting an advertisement based on a bid for a particular advertisement spot is illustrated. In addition to matching advertisements to core content based on user preferences, technical factors, and relative values, the selection of advertisements to be included with core content may be based on the amount paid for each advertisement. Of course, each advertiser differs in the monetary resources for advertisements and may desire advertisements associated with a particular class or quality of video content. For example, an advertiser may desire higher class or quality of advertisement, such as flash object advertisements, on the condition that the core content also be of high quality and highly matches the product or service advertised. Conversely, other advertisers may desire a lower quality of core content and/or product matching to because of advertisement cost concerns.

As such, the selection of advertisements may be based on the amount of currency each advertiser is willing to pay for a particular advertisement spot. If the system 500 is unable to determine a suitable advertisement match (e.g., no advertiser has offered or bid the minimum threshold amount for the advertisement spot), the advertisement spot may be filled with service provider announcements, self-promotions, news, and/or other informative data. For example, if all current bids of all advertisement auction participants remains below the pre-defined threshold of commercial value of the particular advertisement spot (which may include both a spatial and/or temporal component), the system 500 may use one or more of the default advertisements.

As with the system 10, 230, and 450 described above, some of the components of the system 500 may be embodied as software and/or hardware and be located on a remote server (e.g., user/subscriber profile data entering software) and/or on the end-user's personal computer (e.g., software for collecting the viewer feedback, content rating, voting and similar data). The system 500 for selecting an advertisement includes devices and steps similar to the systems 230 and 450 described above in regard to FIGS. 11 and 15, respectively. As shown in FIG. 17, the system 500 includes a video or other multimedia ingest station or server 502 and an auxiliary or advertisement content ingest station or server 504. Each of the servers 502, 504 are configured to search or otherwise receive content from any number of public networks 506, such as the Internet, and private networks 508. To do so, each of the servers 502, 504 execute a number of algorithms. For example, in regard to the video ingest server 502, the server 502 retrieves video and other multimedia data from the public network 506 and the private network 508 in a process step 510. Such video and other multimedia data may include video data, text, and other graphics such as pictures or the like.

Additionally, the video ingest server 502 may also retrieve various metadata related to the retrieved video. For example, the video ingest server 502 may retrieve video clip ratings, information regarding the authors of the video, additional information regarding the video itself such as subject matter, participants or actors, locations, and so on. It should be appreciated that the additional metadata related to the retrieved videos and other multimedia data may be retrieved contemporaneously with the video, retrieved prior to video, or retrieve at a later time. For example, in embodiments wherein the video ratings are retrieved contemporaneously or at a later time relative to the video, the videos may be stored and subsequently classified. For example, the videos may be stored according to the priority class (e.g., first tier, second tier, third tier, etc.). Alternatively, in some embodiments, the video ratings may be received first such that the retrieval of videos may be prioritized based on such ratings.

In some embodiments, the video content ingest server 502 may access a user profile database (e.g., database 128 as described above in regard to FIG. 6). The user profile database may include "tags" or other data that identifies the type of video or other multimedia preferred by each user. Such preferences may be aggregated such that the preference of the user base, as a whole, can be determined. Subsequently, the retrieval of the videos and other multimedia data may be prioritized based on the preferences of the user base. That is, the preferences of the users may be compared to the metadata associated with each video clip or other multimedia data to determine the priority of the particular video. The videos may then be retrieved according to the order of priority. The retrieval and/or classification of retrieved videos and other multimedia data may be further refined or modified based on the video ratings, other metadata, popularity of the retrieved video among the user base, and/or the like. As such, the collection of videos and other multimedia data will correlate to the preference of the user base.

The retrieved video or other multimedia data, along with any associated metadata; is subsequently provided to a core video data and metadata buffer 516. Additionally, the retrieved video or other multimedia data is provided to a technical metadata analyzer 512. The technical metadata analyzer 512 performs a number of analysis's on the video or other multimedia content to determine technical metadata or aspects of the video. For example, the technical metadata analyzer 512 may determine the encoding format, picture resolution, frame rate, picture aspect ratio, presence of "black bands, the audio and/or video signal levels, noise, blockiness, sharpness, color, and/or the like of the video. Such technical metadata is also provided to the video buffer 516.

In some embodiments, the retrieved video or other multimedia data may also be evaluated by an operator of the video content ingest server 502 in a process step 514. The operator may provide subjective quality rating data and aspect ratio data of the video or other multimedia data. Such subjective data may or may not match the results of the automatic analysis performed by the analyzer 512. Additionally, any copyright issues (e.g., digital rights management) are addressed in process step 514. To do so, metadata extracted from the video file header (e.g., the genre and any copyright data) or derived therefrom may be used. For example, if it is determined that the video or other multimedia data may infringe on the copyright of the owner, such video may be deleted from the system 500 and flagged accordingly such that the video is not retrieved at a later date.

The core video data and metadata buffer 516 converts all incoming data into the format suitable for storage in a content database 518. Additionally, any conflicts or erroneous data associated with the video or other multimedia data may be flagged, replaced with default values, or otherwise reconciled. The re-formatted and filtered video data or other multimedia data along with any metadata including the technical metadata determined by the analyzer 512 are stored in the content database 518.

Referring back to the auxiliary content ingest server 504, the server 504 retrieves auxiliary data from the public network 506 and the private network 508 in a process step 520, which may occur contemporaneously with the retrieval of video data by the video content ingest server 502. Such auxiliary data may include advertisements and other informative data, which may be embodied as text and/or graphical objects including static and/or dynamic images. The retrieved advertisements and other informative data are potentially suitable to match the video and other multimedia data retrieved by the server 502. The prioritization of the acquisition of auxiliary content data may be based on such factors as the commercial advertising rates and similar general business parameters. Additionally, the prioritization of the auxiliary content data may be based on the statistics of registered user profile data, users' explicit requests, and/or users' implicit demand, which may be estimated in accordance with the users' preferences and/or viewing history.

The retrieved auxiliary data is provided to a technical metadata analyzer 522, which may be similar to the analyzer 242 described above. The technical metadata analyzer 522 performs a number of analysis's on the auxiliary data to determine technical metadata or aspects of the auxiliary data. For example, the technical metadata analyzer 522 may determine the number of phrases (statements), statement lengths (number of characters in the text string), text encoding format, presence, position and length of web-links (URLs strings) within each text statement, pictures encoding format, pictures resolution and/or the like associated with the auxiliary data. Such technical metadata, and any original metadata, is subsequently stored in the central content database along with the re-formatted and filtered auxiliary data.

Once video and auxiliary data have been stored in the content database, the auxiliary content that best matches a particular video may be determined such that the video and auxiliary content (e.g., advertisements) may be displayed on the same screen. Such combinations of video and auxiliary data may be determined prior to any request for the video from users or determined in response to each quest for the particular video. To do so, the video or other multimedia content is first paired with suitable auxiliary content. Subsequently, a suitable presentation layout template is determined for the combined content.

The video or other multimedia content is paired with suitable auxiliary content by an advertisement determination system 524 via use of a number of data vectors corresponding to metadata of the video and the auxiliary content. For example, in one particular embodiment, the advertisement determination system 524 is configured to match or otherwise correlate a core content genre tags vector, a clip duration vector, a video clip value rating vector, an auxiliary content genre tags vector, an auxiliary content resource vector, and an advertising data commercial value. It should be appreciated that the boundary condition for such a correlation or matching process including the selection of an amount of auxiliary data that approximately correlates with the video clip duration. For example, a thirty second video clip may require four text messages, each having a length of thirty characters or less.

Further, the video or other multimedia content is paired with the auxiliary content based on the winning "bid" from advertisers for the particular advertisement spot (both spatially and/or temporally). To do so, as described in more detail below in regard to FIG. 18, the advertisement determination system 524 is configured to retrieve user profiles from a user profile database 526 and advertisers' profiles from an advertisers profile database 528. The advertisement determination system 524 may determine the advertisement for a particular advertisement spot by comparing the bids from each advertiser to determine the highest bid. If none of the bids exceed the minimum monetary threshold for the particular advertisement spot, the advertisement determination system 524 may place a predetermined advertisement in the advertisement spot as discussed earlier.

The advertisement determination system 524 generates an edit decision list (EDL) 530, which includes the instructions necessary for an audio-video processor 532 to convert the original video clips (core content) and advertisements (auxiliary content) into dynamic composite images viewed by users. The audio-video processors 532 may be located in a central or local position (e.g., at the head-end media distribution device of the television service provider or within the set-top box of the end-user). In embodiments wherein the audio-video processor 532 is located in the residence of the end-user, the edit decision list (EDL) 530 may be generated at the head-end station and subsequently delivered to the set-top box of the end-user along with the video stream (e.g., the edit decision list (EDL) 530 may be delivered as hypertext markup language). Each edit decision list (EDL) 530 includes the detailed information about the attributes (sizes, screen and time-line positions, colors, etc.) of the components of the resulting composite images (e.g., the core video, ads texts, optional graphics, etc.). The functionally of the audio-video processor 532 may include video switching (to add interstitial commercials between fragments of core video clip) and video data scaling-mixing (to combine scaled core video with the interstitial advertisement texts/graphics).

Figure 18:
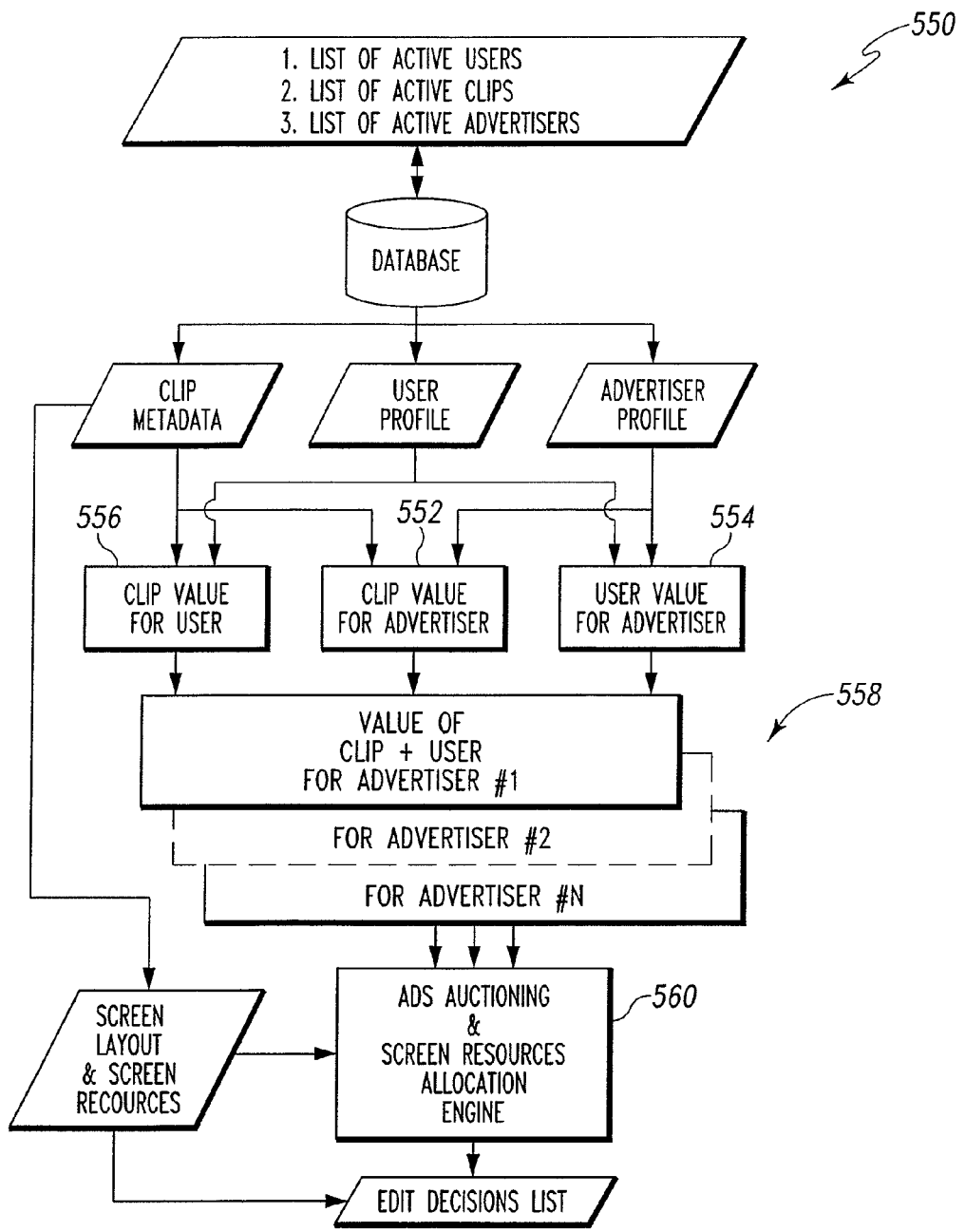
FIG. 18 is a flowchart of the process flow one embodiment of the system of FIG. 17.

Referring now to FIG. 18, the data workflow 550 of the advertisement determination system 524 is illustrated. The advertisement determination system 524 receives a number of inputs including the list of active users (e.g., the video-on-demand subscribers, users currently requesting video clips, etc.), the list of active video clips or other multimedia data (i.e., the video clips requested by the active users), and the list of active advertisers (i.e., the advertisers currently involved in the advertisement bidding process). Each item of such lists is accompanied by the set of metadata, which describes this particular item. The metadata may be pre-set or pre-calculated. For example, the metadata may include a core content category tag (e.g., spoof comedy, USA, English/Spanish, mature adults only), a user profile (e.g., medium income, white, male, preferred video genre=action movie), and/or an advertiser profile (e.g., target audience=pet lovers and senior persons, money resources=$20 per 30 second of interstitial commercials screen time, $5 per 30 second of simple interstitial text messaging).

In addition to the collection of normal advertiser, a default advertiser is also used. The default advertiser includes an advertiser profile and is typically present on any list of active advertisers. The default advertiser replaces other advertisers if the bids of the other advertisers are determined to not be high enough as discussed above. Additionally, the default advertiser may be used when an end-user requests a video clip that does not have a matching advertiser profile. In some a case, the advertisement determination system 524 may be configured to provide the requested video clip as-is or may incorporate additional default auxiliary content such as service provider system announcements, trivia, quizzes, and/or other free educative/informative content.

In process step 552, the value of each video clip currently ordered by a user of the system 500 is determined for a particular advertiser. Such calculation is performed without reference to the particular user. For example, an action movie may be determined to highly match a car advertiser and moderately match a pet food advertiser. However, such a movie may not match the profile of an organic food advertiser (i.e., the value of the movie for this particular advertiser is zero or nearly zero. This calculation also considers other clip metadata (e.g., technical metadata). For example, a high resolution, low noise video clip may be determined to be more valuable than a low resolution, noisy video clip. Of course, it may be that such a low resolution, noisy video clip is the only video clip available and/or suitable for the particular advertiser.

Next, in process step 554, the value of each end-user requesting a video or other multimedia data is determined for a particular advertiser. For example, a high-income owner of an older, expensive vehicle may be valuable as a target for BMW car ads while a twenty year old university student may have only moderate value for the particular advertiser.

Subsequently, in process step 556, the value of each currently requested video clip is determined for the particular end-user. Such a parameter is related to the quality of interest (QoI). For example, an action movie may be assigned a high value if such a genre was explicitly stated in the user's profile. Additionally, the action movie may be assigned a high value if the particular user has recently requested similar movies, which may be determined based on an analysis of the user's viewing history profile. The value of the video clip may, of course, be adjusted based on technical metadata affecting the subjective perception of image and/or sound quality.

In process step 558, the multi-dimensional set of values, which were created in the previous steps, is converted into a number of one-dimensional arrays. Each member of this array represents the combined commercial value for the particular advertiser of the video clip and the end-user requesting this clip. Such column arrays, sorted in the descending or ascending order, may refer to all video clips and all participant advertisers. However, some data cells may contain zero values. Such data cells represent disqualified video clips that do not match the requirements of the particular advertiser. Such video clips may be ignored in the following process steps.

The output of the process step 558 may also include three two-dimensional cross-reference tables: "Current Users and Clips", "Clips by Categories", and "Users by Categories". Such tables may be used for monitoring purposes as they allow analysis of the current system activity level.

In process step 560, metadata of the screen presentation resources is retrieved. The metadata is available in the database for each particular video clip The metadata identifies the video clip's duration, resolution, technical quality, and/or the like. For example, the video clip may be presented in windows (tiles) of different sizes, screen layouts, and so on. As such, there are varying amounts of screen presentation resources expressed in square pixels of screen area and seconds on clip time-line. Such resources are the advertisement spots that are for sale in the advertisement auction. Each resource includes a pre-defined weight coefficient (not to be confused with price or price rate). For example, a 30 second long time slot of the first minute of the clip may be determined to be two times more valuable than a 30 second time slot after the fifth minute. A full screen interstitial 30 seconds advertisement value is, of course, greater than 30 seconds of graphic advertisement picture that occupies the bottom quarter of the screen shared with core content.

In process step 560, the metadata associated with the monetary resources (i.e., the buying limit) offered by the advertisers eager to pay for showing their advertisements in combination with the video clips is retrieved. Such metadata is available in the database for all currently present bidders (advertisers) sharing the target audience. The resulting array of monetary values represents all bidders targeting the same clip and the same user (i.e., the target audience).

In addition, in some embodiments, some optional "exclusion" rules may be applied. For example, a car advertisement may be positioned on the video clip timeline next to a pet food advertisement. However, the car advertisement may be flagged to not be positioned next to another car advertisement or within a predetermined period of time of another car advertisement (e.g., a Mercedes advertisement should not be presented immediately after a BMW advertisement). As such, only one of the number of car advertisements will receive the advertisement spot or resource, which will be determined based on which one is offering more momentary resources (i.e., the higher bidder). Additionally, a "Pre-selected Bidders List" may be applied in some embodiments. The pre-selected bidders list may reduce the waste of search engine capacity. That is, deliberately low bids, unreasonably high bids, and/or other out-of-range bids may be disqualified.

To reduce psychological pressure on viewers, an optional "randomization" process may be applied. The randomization process ensures that advertisements of similar nature should not be shown to the same user continuously. That is, the system may be configured to determine that even the highest bidder is not declared a winner several times in a row or receive two time slots within the same clip. Rather, low bidding advertisers, which differ significantly in their category tags may be promoted such that the low bidding advertisers win the advertisement resource. For example, in some embodiments, a car advertisement should not be followed by a motorbike advertisement, which may be considered aggressive marketing by the user. Rather, a neutral advertisement such as a toothpaste advertisement may be presented.

Once the winning advertisers have been determined, the actual screen resources are auctioned. Such an auction allocates available clip presentation resources among the winning advertisers. This may be done by using one of a number of optimal resource allocation algorithms wherein the money resources offered by the advertisers are used as boundary conditions and weighting coefficients. The goal of such optimal resource allocation algorithms is to maximize the total monetary value of the complete advertisement bid (i.e., the sum of all bids) and create composite images that are attractive to the viewer.

In some embodiments, all advertisements may be biased depending on their value for the user. Such biasing may be used when the user's profile contains data about the relevant user preferences (both positive and negative). For example, the user profile may disclose that the user desires to learn more about new car models, vacations, and travel, but actively dislike any information related to pets. As a result, a pet food advertisement bid may be disqualified. Alternatively, if pets are simply not mentioned in the user's profile, any car and travel advertisement bids may be promoted. Such advertisements may be promoted by moving the advertisements to more favorable positions at the beginning of the clip and moving any pet food advertisements later into the video clip timeline.

The final output of the advertisement determination system 524 is a set of edit decisions lists (EDLs) 530. As discussed above, the edit decisions lists (EDLs) contain the instructions used by the audio-video processors (AVPs) 532 to convert the core content video clips and any advertisements into dynamic composite images that may be viewed by the end-users.

Figure 19:
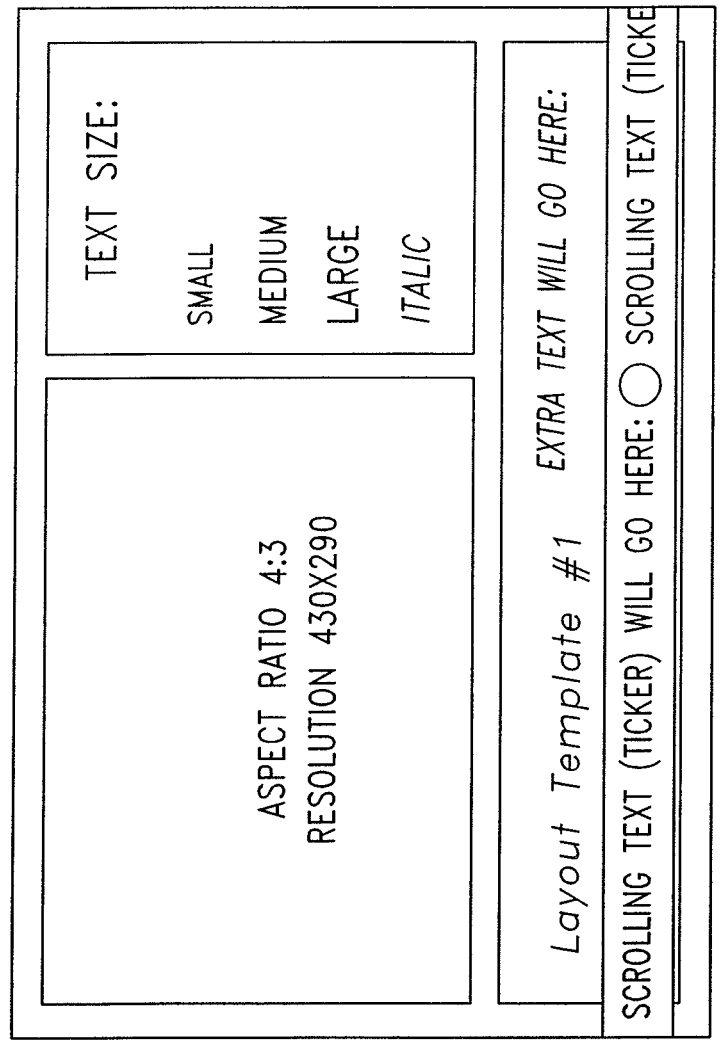
FIG. 19 is an illustrative screen layout used by the system of FIG. 17.

Referring now to FIG. 19, an illustrative screen layout 600 is shown. In the screen layout 600, the screen resources are shared among core video content (rectangular tile in upper left corner) and auxiliary content (e.g., advertisement data). The auxiliary content may be displayed in the form of static or moving texts as well as static or dynamic graphic objects. Additionally, in other embodiments, any one of the screen layouts illustrated in and discussed above in regard to FIG. 12 may be used.

It should be appreciated while each of the systems 10, 230, 400, 450, 500 have been described above as separate systems configured for one or more particular functions, any two or more of the systems 10, 230, 400, 450, 500 may be combined into a single system performing each function in other embodiments. For example, in one particular embodiment, each of the systems 10, 230, 400, 450, 500 are incorporated into a single system for delivery multimedia data.

While the disclosure has been illustrated and described in detail in the drawings and foregoing description, such an illustration and description is to be considered as exemplary and not restrictive in character, it being understood that only illustrative embodiments have been shown and described and that all changes and modifications that come within the spirit of the disclosure are desired to be protected.

There are a plurality of advantages of the present disclosure arising from the various features of the systems, devices, and methods described herein. It will be noted that alternative embodiments of the systems, devices, and methods of the present disclosure may not include all of the features described yet still benefit from at least some of the advantages of such features. Those of ordinary skill in the art may readily devise their own implementations of the systems, devices, and methods that incorporate one or more of the features of the present invention and fall within the spirit and scope of the present disclosure as defined by the appended claims.

The invention claimed is:

1. A system for delivering multimedia, the system comprising:
   a plurality of media devices coupled to each other via a network, each media device being configured:
      to retrieve multimedia data and advertisement data from an external source, the multimedia data including a number of video clips and the advertisement data including a number of advertisements,
      store the multimedia data and the advertisement data,
      transmit the multimedia data to at least one other media device in response to a request for the multimedia data, and
      associate an advertisement of the advertisement data to a video clip of the multimedia data;
   wherein at least one of the media devices is further configured to:
      determine a number of available sources of the multimedia data that are external to the at least one of the media devices;
      select a subset of the number of available sources based on a determination of proximity of each of the number of available sources relative to the at least one other media device;
      retrieve first portions of the multimedia data from a first group of sources selected from the subset of the number of available sources; and
      retrieve second portions of the multimedia data from a second group of sources selected from the subset of the number of available sources, where the first group of sources and the second group of sources are different groups;
      wherein the first portions are transmitted to the at least one other media device before the second portions;
      wherein the first group of sources selected from the subset of the number of sources are physically farther from the at least one other media device than the second group of sources selected from the subset of the number of available sources.

2. The system of claim 1, wherein to store the multimedia data comprises to store the multimedia data in a distributed manner.

3. The system of claim 1, wherein to associate the advertisement to the video clip comprises to associate the advertisement to the video clip based on metadata associated with the video clip and the advertisement.

4. The system of claim 1, wherein to associate the advertisement to the video clip comprises to associate the advertisement to the video clip based on at least one of a category of the video, a category of the advertisement, a profile of a user requesting the video, and a popularity of the video.

5. The system of claim 1, wherein the network is a hybrid peer-to-peer-client/server network.

6. The system of claim 1, wherein each media device is further configured to transmit an associated video and advertisement to a television service provider headend station.

7. The system of claim 1, further comprising a playback device coupled to at least one of the media devices and located remotely therefrom, the playback device being configured to receive an associated video and advertisement from the coupled media device in response to a request from a user of the playback device and display the associated video and advertisement to the user.

8. The system of claim 7, wherein the playback device is configured to display a preview of available videos to the user and generate a request for a video in response to a selection made by the user.

9. The system of claim 8, wherein the playback device is configured to upload a video to one of the media devices in response to a command provided by the user.

10. The system of claim 1, wherein the at least one of the media devices is further configured to select the sub-set of the number of available sources based on a bunny-hill algorithm to ensure the availability of the first portions to the playback device.

11. The system of claim 1, wherein the determination of proximity is directionally sensitive.

12. The system of claim 1, wherein the at least one media device is further configured to modify network conditions to change the determination of proximity.

13. The system of claim 1, wherein the determination of proximity changes over time.

14. A method for delivering multimedia, the method comprising:
retrieving multimedia data from an external source, the multimedia data including a number of video clips;
selecting advertisement data comprising a number of advertisements based on a combination of a bid for an advertisement spot in the multimedia data and other advertisements associated with the multimedia data, wherein the bid at least exceeds a minimum threshold amount; and
retrieving the advertisement data, the advertisement data including a number of advertisements;
storing the multimedia data and the advertisement data in one or more of a plurality of media devices coupled to each other via a network;
transmitting the multimedia data to at least one other media device over a network in response to a request for the multimedia data; and
associating an advertisement of the advertisement data to a video clip of the multimedia data;

determining a number of available sources of the multimedia data;
selecting a subset of the number of available sources based on a determination of a proximity of each of the number of available sources relative to the one or more of the plurality of media devices;
retrieving first portions of the multimedia data from a first group of sources selected from the subset;
retrieving second portions of the multimedia data from a second group of sources selected from the subset, the first group and the second group different groups;
the first portions being transmitted to the one or more of the plurality of media devices before the second portions; and
the first group being physically farther from the one or more of the plurality of media devices than the second group.

15. The method of claim 14, wherein storing the multimedia data comprises to storing the multimedia data in a distributed manner between at least two of the media devices.

16. The method of claim 14, wherein associating the advertisement data to the video clip comprises associating the advertisement to the video clip based on metadata associated with the video clip and the advertisement.

17. The method of claim 14, wherein associating the advertisement data to the video clip comprises associating the advertisement to the video clip based on at least one of a category of the video, a category of the advertisement, a profile of a user requesting the video, and a popularity of the video.

18. The method of claim 14, wherein transmitting the multimedia data to the at least one other media device over the network comprises transmitting the multimedia data to the at least one other media device over a hybrid peer-to-peer-client/server network.

19. The method of claim 14, further comprising transmitting an associated video and advertisement to a television service provider headend station.

20. The method of claim 14, further comprising:
receiving associated video and an advertisement with a playback device coupled to at least one of the media devices and located remotely therefrom in response to a request form a user of the playback device; and
displaying the associated video and the advertisement to the user.

21. The method of claim 20, further comprising:
displaying a preview of available videos to the user; and
generating a request for a video in response to a selection made by the user.

22. The method of claim 21, further comprising uploading a video to one of the media devices in response to a command provided by the user.

23. The method of claim 20, further comprising:
determining a number of available sources of the user requested video; and
selecting a sub-set of the number of available sources based on a calculated download time of each number of available sources.

24. A system for delivering multimedia, the system comprising:
a plurality of media devices coupled to each other via a network, each media device being configured:
to retrieve multimedia data and advertisement data from a selection of determined external sources comprising a first group of sources and a second group of sources, the multimedia data including a number of video clips and the advertisement data including a number of advertisements, where first parts of the multimedia data are retrieved from the first group of sources that are located physically farther from each the media devices than the second group of sources from which second parts of the multimedia data are retrieved, the first group and the second group different groups, the first parts being retrieved before the second parts, store the multimedia data and the advertisement data, transmit the multimedia data to at least one other media device in response to a request for the multimedia data, and associate an advertisement of the advertisement data to a video clip of the multimedia data;

wherein each media device is further configured to transmit the associated video and advertisement to a television service provider headend station;

wherein the television service provider headend station comprises a broadcast interface module coupled to both a switched digital video server and a video-on-demand server.

25. The system of claim 24, wherein one or more of the plurality of media devices is configured to convert the associated video into a broadcast-able data file in accordance with a predetermined video format.

26. The system of claim 25, wherein the predetermined video format is viewable by a standard television.

27. The system of claim 24, wherein one or more of the plurality media devices is configured to transport control data and auxiliary content data using an Enhanced Television Binary Format.

* * * * *